United States Patent
Garofalakis et al.

(10) Patent No.: US 6,473,757 B1
(45) Date of Patent: Oct. 29, 2002

(54) SYSTEM AND METHOD FOR CONSTRAINT BASED SEQUENTIAL PATTERN MINING

(75) Inventors: Minos N. Garofalakis, Chatham Township; Rajeev Rastogi, New Providence; Kyuseok Shim, Basking Ridge, all of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/537,082

(22) Filed: Mar. 28, 2000

(51) Int. Cl.[7] .............................. G06F 17/30; G06F 7/00
(52) U.S. Cl. ........................................................ 707/6
(58) Field of Search ............................. 707/2, 6, 9, 10

(56) References Cited

U.S. PATENT DOCUMENTS

| | | | | |
|---|---|---|---|---|
| 5,742,811 A | * | 4/1998 | Agrawal et al. | 707/5 |
| 5,794,209 A | * | 8/1998 | Agrawal et al. | 705/10 |
| 5,819,266 A | * | 10/1998 | Agrawal et al. | 707/6 |
| 6,138,117 A | * | 10/2000 | Bayardo | 707/101 |
| 6,389,416 B1 | * | 5/2002 | Agarwal et al. | 706/18 |

OTHER PUBLICATIONS

Agrawal, R; Srikant, R. "Mining Sequential Patterns" Proceedings of the Eleventh International Conference on Data Engineering, 1995. pp. 3–14.*

* cited by examiner

Primary Examiner—John Breene
Assistant Examiner—Susan Rayyan
(74) Attorney, Agent, or Firm—Ference & Associates

(57) ABSTRACT

The present invention provides a method and system for sequential pattern mining with a given constraint. A Regular Expression (RE) is used for identifying the family of interesting frequent patterns. A family of methods that enforce the RE constraint to different degrees within the generating and pruning of candidate patterns during the mining process is utilized. This is accomplished by employing different relaxations of the RE constraint in the mining loop. Those sequences which satisfy the given constraint are thus identified most expeditiously.

18 Claims, 12 Drawing Sheets

| DATA SET D |
|---|
| < 1 2 3 2 > |
| < 1 1 2 2 > |
| < 2 4 3 4 > |
| < 2 3 4 3 > |
| < 1 1 2 3 > |

| $C_4$ | COUNT |
|---|---|
| <1 1 2 2> | 1 |
| <1 1 2 3> | 1 |

| $F_3$ |
|---|
| <1 1 2> |
| <1 2 2> |
| <1 2 3> |
| <2 3 4> |
| <2 4 3> |

| $C_3$ | COUNT |
|---|---|
| <1 1 1> | 0 |
| <1 1 2> | 2 |
| <1 1 3> | 1 |
| <1 2 2> | 2 |
| <1 2 3> | 2 |
| <2 2 2> | 0 |
| <2 2 3> | 0 |
| <2 2 4> | 0 |
| <2 3 4> | 2 |
| <2 4 3> | 2 |

| $F_2$ |
|---|
| <1 1> |
| <1 2> |
| <1 3> |
| <2 2> |
| <2 3> |
| <2 4> |
| <3 4> |
| <4 3> |

SPIRIT(N)

FIG. 2(c)

| STATE | $F_2$ |
|---|---|
| a | <1 1> |
| a | <1 2> |
| a | <2 2> |
| a | <2 3> |
| b | <3 4> |

| STATE | $C_3$ | COUNT |
|---|---|---|
| a | <1 1 1> | 0 |
| a | <1 1 2> | 2 |
| a | <1 2 2> | 2 |
| a | <1 2 3> | 2 |
| a | <2 3 4> | 2 |

| STATE | $F_3$ |
|---|---|
| a | <1 1 2> |
| a | <1 2 2> |
| a | <1 2 3> |
| a | <2 3 4> |

| STATE | $C_4$ | COUNT |
|---|---|---|
| a | <1 1 2 2> | 1 |
| a | <1 1 2 3> | 1 |

SPIRIT(L)

FIG. 2(d)

FIG. 2(e) SPIRIT(V)

| STATE | $F_2$ |
|---|---|
| a | <22> |
| a | <34> |

| STATE | $C_3$ | COUNT |
|---|---|---|
| a | <122> | 2 |
| a | <234> | 2 |

| STATE | $F_3$ |
|---|---|
| a | <122> |
| a | <234> |

| STATE | $C_4$ | COUNT |
|---|---|---|
| a | <1122> | 1 |
| a | <1234> | 0 |

FIG. 2(f) SPIRIT(R)

| $F_2$ |
|---|
| <22> |

| $C_3$ | COUNT |
|---|---|
| <122> | 2 |
| <234> | 2 |

| $F_3$ |
|---|
| <122> |
| <234> |

| $C_4$ | COUNT |
|---|---|
| <1122> | 1 |
| <1234> | 0 |

| D |
|---|
| < {1, 2} {3} {4, 5} > |
| < {1, 2} {3, 4} {4, 5} > |
| < {2} {3, 4} > |

DATA SET

AUTOMATON FOR {1}({3, 4} | {5})

| FREQUENT AND VALID SEQUENCES |
|---|
| < {1} {5} > |
| < {1} {4, 5} > |
| < {1, 2} {4, 5} > |

FREQUENT AND VALID SEQUENCES

DETERMINISTIC FINITE AUTOMATON FOR THE RE 1* (2 2 | 2 3 4 | 4 4)

SYSTEM AND METHOD FOR CONSTRAINT BASED SEQUENTIAL PATTERN MINING

FIELD OF THE INVENTION

The present invention relates generally to computer database mining, and more particularly to sequential pattern mining.

BACKGROUND OF THE INVENTION

The volume of data stored in electronic format has increased dramatically over the past two decades. The increase in use of electronic data gathering devices such as point-of-sale or remote sensing devices has contributed to this explosion of available data. Data storage is becoming easier and more attractive to the business community as the availability of large amounts of computing power and data storage resources are being made available at increasingly reduced costs.

With so much attention focused on the accumulation of data, there has arisen a complimentary need to focus on how this valuable resource can be utilized. Businesses have recognized that valuable insights can be gleaned by decision-makers who make effective use of the stored data. By using data mining tools that are effective to obtain meaningful data from millions of bar code sales transactions, or sales data from catalog companies, it is possible to gain valuable information about customer buying behavior. The derived information might be used, for example, by retailers in deciding which items to shelve in a supermarket, or for designing a well targeted marketing program, among others. Numerous meaningful insights can be unearthed from the data utilizing proper analysis techniques.

One analysis technique involves discovering frequent sequential patterns from a large database of sequences. A major problem users experience attempting to use this technique is the lack of user-controlled focus in the pattern mining process. Typically, the interaction of the user in a pattern mining technique is limited to specifying a lower bound on the desired support for the extracted patterns. An appropriate mining algorithm typically returns a very large number of sequential patterns, only some of which may be of actual interest to the user. Despite its conceptual simplicity, this "unfocused" approach to sequential pattern mining suffers from two major drawbacks.

The first major drawback is a disproportionate computational cost for selective users. Given a database of sequences and a fixed value for the minimum support threshold, the computational cost of the pattern mining process is fixed for any potential user. The problem here is that despite the development of efficient algorithms, pattern mining remains a computation-intensive task typically taking hours to complete. Thus, ignoring user focus can be extremely unfair to a highly selective user that is only interested in patterns of a very specific form.

The second major drawback is the overwhelming volume of potentially useless results. The lack of tools to express user focus during the pattern mining process means that selective users will typically be swamped with a huge number of frequent patterns, most of which are useless for their purposes. Sorting through this morass of data to find specific pattern forms can be a daunting task, even for the most experienced user.

Thus, a need has been recognized in conjunction with database mining that improves upon the shortcomings of previous efforts in the field, including those discussed above.

SUMMARY OF THE INVENTION

The present invention broadly contemplates a system and method for mining frequent sequential patterns under structural constraints on the interesting patterns. The novel pattern mining techniques of the present invention enable the incorporation of user-controlled focus in the mining process. To achieve this, two subsidiary problems are addressed. First, is a need for a flexible constraint specification language that allows users to express the specific family of sequential patterns that they are interested in. Second, is a need for novel pattern mining algorithms that can exploit user focus by pushing user-specified constraints deep inside the mining process. The present invention exploits pattern constraints to prune the computational cost and ensure system performance that is commensurate with the level of user focus (i.e., constraint selectivity), as selective users should not be penalized for results that they did not ask for.

In accordance with the present invention, a Regular Expression (RE) is used for identifying the family of interesting frequent patterns. A family of methods that enforce the RE constraint to different degrees within the generating and pruning of candidate patterns during the mining process is utilized. This is accomplished by employing different relaxations of the RE constraint in the mining loop. Those sequences which satisfy the given constraint are thus identified most expeditiously. Experimental results demonstrate that speedups of more than an order of magnitude are possible when Regular Expression constraints are pushed deep inside the mining process in accordance with the present invention.

Method steps of the present invention can appropriately and advantageously be carried out using a suitably programmed general purpose computer. Moreover, these steps may also be implemented on an Integrated Circuit or part of an Integrated Circuit. Thus, it is to be understood that the invention may be implemented in hardware, software, or a combination of both. Accordingly, the present invention includes a program storage device readable by machine to perform any of the method steps herein described for sequential pattern mining with regular expression constraints. Again, it is to be emphasized that any of the method steps, in any combination, can be encoded and be tangibly embodied on a program storage device in accordance with the present invention.

BRIEF DESCRIPTION OF THE DRAWINGS

FIGS. 2(a)–(f) show a data set of sequences, an automaton, and the set of candidate sequences for which support is computed by the preferred techniques of the present invention.

DETAILED DESCRIPTION

Figure 1:
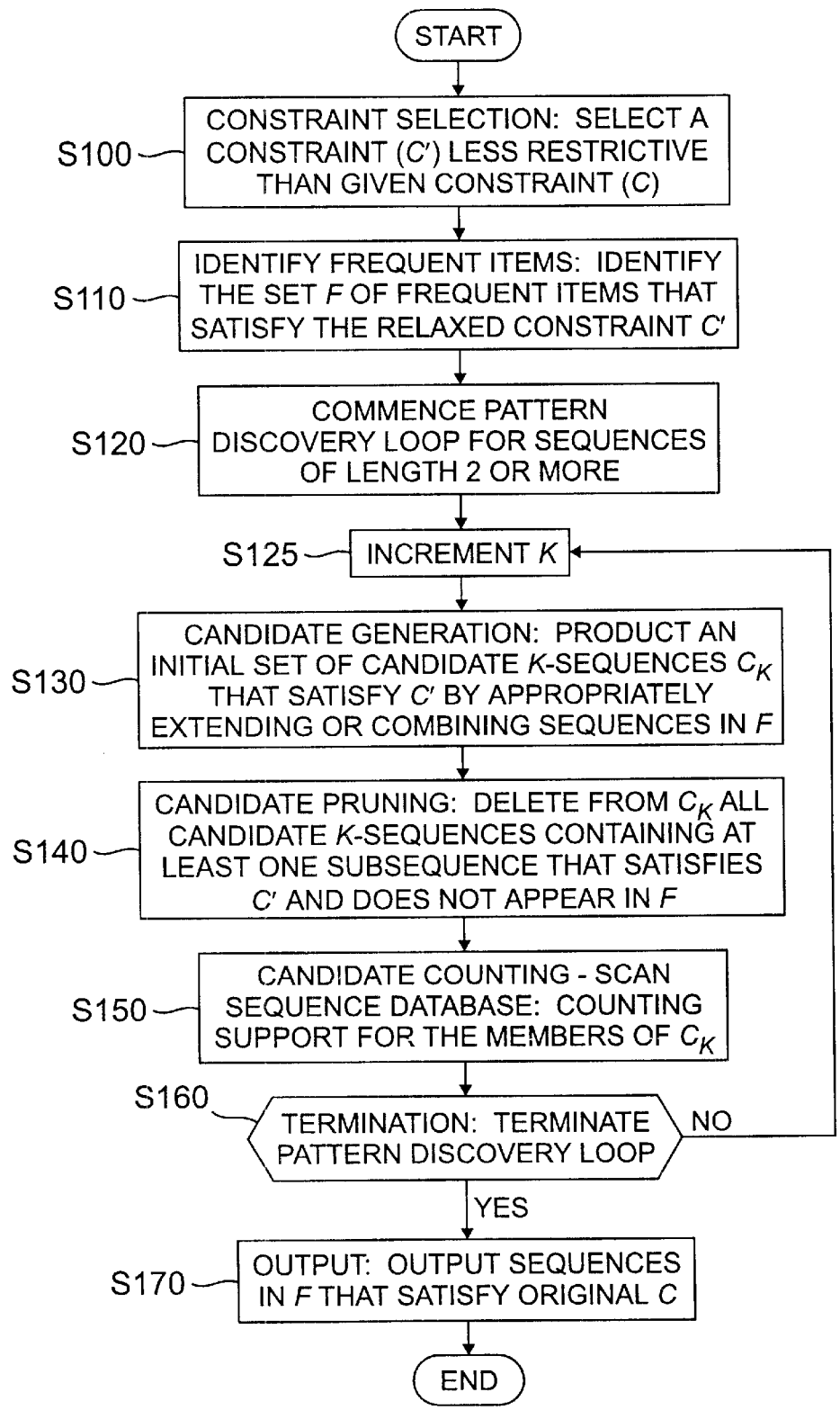
FIG. 1 is a high level flow chart describing how the database mining is performed in accordance with the present invention.

The present invention is directed to a method of sequential pattern mining with regular expression constraints. Discovering sequential patterns from a large database of sequences is an important problem in the field of knowledge discovery and data mining. Briefly, given a set of data sequences, the problem is to discover subsequences that are frequent, in the sense that the percentage of data sequences containing them exceeds a user-specified minimum support. Mining frequent sequential patterns has found a host of potential application domains, including retailing (i.e., market-basket data), telecommunications, medicine, and, more recently, the World Wide Web (WWW). In market-basket databases, each data sequence corresponds to items bought by an individual customer over time and frequently occurring patterns can be very useful for predicting future customer behavior. In telecommunications, frequent sequences of alarms output by network switches capture important relationships between alarm signals that can then be employed for on-line prediction, analysis, and correction of network faults. In the medical field, frequent temporal patterns of symptoms and diseases exhibited by patients identify strong symptom/disease correlations that can be an invaluable source of information for medical diagnosis and preventive medicine. Finally, in the context of the WWW, server sites typically generate huge volumes of daily log data capturing the sequences of page accesses for thousands or millions of users. Discovering frequent user access patterns in WWW server logs can help improve system design (e.g., better hyperlinked structure between correlated pages) and lead to better marketing decisions (e.g., strategic advertisement placement). (While WWW servers generally only have knowledge of the IP address of the user/proxy requesting a specific web page, referrers and cookies can be used to determine the sequence of accesses for a particular user without compromising the user's identity.)

As a more concrete example, the Yahoo! Internet directory (www. yahoo. com) enables users to locate interesting WWW documents by navigating through large topic hierarchies consisting of thousands of different document classes. These hierarchies provide an effective way of dealing with the abundance problem present in today's keyword-based WWW search engines. The idea is to allow users to progressively refine their search by following specific topic paths (i.e., sequences of hyperlinks) along a (predefined) hierarchy. Given the wide variety of topics and the inherently fuzzy nature of document classification, there are numerous cases in which distinct topic paths lead to different document collections on very similar topics. For example, starting from Yahoo!'s home page users can locate information on hotels in New York City by following either Travel: Yahoo!Travel: North America: United States: New York: New York City: Lodging: Hotels or travel: Lodging: Yahoo!Lodging: New York: New York Cities: New York City: Hotels and Motels, where ":" denotes a parent-child link in the topic hierarchy. Mining user access logs to determine the most frequently accessed topic paths is a task of immense marketing value, e.g., for a hotel or restaurant business in New York City trying to select a strategic set of WWW locations for its advertising campaign. The problem is to identify only the specific family of sequential patterns of interest. A hotel planning its ad placement may only be interested in paths that (a) begin with Travel, (b) end in either Hotels or Hotels and Motels, and (c) contain at least one of lodging, Yahoo!Lodging, Yahoo!Travel, New York, or New York city, since these are the only topics directly related to its line of business.

In accordance with the present invention, regular expressions (REs) may be used as a constraint specification tool to identify only the specific family of sequential patterns of interest. REs provide a simple, natural syntax for the succinct specification of families of sequential patterns. REs also possess sufficient expressive power for specifying a wide range of interesting, non-trivial pattern constraints. These observations are validated by the extensive use of REs in everyday string processing tasks (e.g., UNIX shell utilities like grep or ls) as well as in recent proposals on query languages for sequence data (e.g., the Shape Definition Language of Agrawal et al., "Querying Shapes of Histories", Proc. Of the $21^{st}$ International Conference of Very Large Databases, Zurich, Switzerland, September 1995. Continuing with the "New York City hotels" example, the constraint on topic paths can be simply expressed as the following RE:

Travel (Lodging|Yahoo !Lodging|Yahoo !Travel|New York|New York City) Hotels|Hotels and Motels), where "|" stands for disjunction.

The techniques of the present invention exploit the equivalence of REs to deterministic finite automata to push RE constraints deep inside the pattern mining computation. The main distinguishing factor of the present techniques is the degree to which the RE constraint is enforced within the generation and pruning of candidate patterns during the mining process. Varying the level of user focus (i.e., RE enforcement) during pattern mining gives rise to certain tradeoffs with respect to computational effectiveness. Enforcing the RE constraint at each phase of the mining process certainly minimizes the amount of "state" maintained after each phase, focusing only on patterns that could potentially be in the final answer set. Minimizing this maintained state may not always be the best solution, however, since it can limit the ability to do effective support-based pruning in later phases. Such tradeoffs are related to fact that the RE constraints do not satisfy the property of anti-monotonicity.

Sequences, Regular Expressions, and Finite Automata

The main input to the process described herein consists of a database of sequences, where each sequence is an ordered list of elements. These elements can be either (a) simple items from a fixed set of literals (e.g., the identifiers of WWW documents available at a server, the amino acid symbols used in protein analysis, or (b) itemsets, that is, non-empty sets of items (e.g., books bought by a customer in the same transaction). The list of elements of a data sequence s is denoted by $<s_1 s_2 \ldots s_n>$, where $s_i$ is the $i^{th}$ element of s. If s is a sequence of itemsets, then the set of simple items corresponding to element $s_i$ is represented as $\{s_i^1, \ldots, s_i^{k_i}\}$ |s| is used to denote the length (i.e., number of elements) of sequence s. A sequence of length k is referred to as a k-sequence. The terms "sequence" and "sequential pattern" are considered to be equivalent. The following summarizes the notation used in connection with the techniques of the present invention.

| Symbol | Semantics |
| --- | --- |
| s, t, u, ... | Generic sequences in the input database |
| < s t > | Sequence resulting from the concatenation of sequences s and t |
| \|s\| | Length i.e., number of elements, of sequence s |
| $s_i$ | $i^{th}$ element of sequence s |
| $s_i^*$ | Zero or more occurrences of element $s_i$ (Kleene closure operator) |
| $s_i \mid s_j$ | Select one element out of $s_i$ and $s_j$ (Disjunction operator) |
| R | Regular expression (RE) constraint |
| $A_R$ | Deterministic finite automaton for Re R |
| b, c, d, ... | Generic states in automaton $A_R$ |
| a | Start state of automaton $A_R$ |
| $b \xrightarrow{s_i} c$ | Transition from state b to state c in $A_R$ on element $s_i$ |
| $b \xRightarrow{s} c$ | Transition path from state b to state c in $A_R$ on the sequence of elements s |
| $C_k$ | Set of candidate k-sequences |
| $F_k$ | Set of frequent k-sequences |

In considering two data sequences s=<$s_1 s_2 \ldots s_n$> and t=<$t_1 t_2 \ldots t_m$>, s is a subsequence of t if s is a "projection" of t, derived by deleting elements and/or items from t. More formally, s is a subsequence of t if there exist integers $j_1 < j_2 < \ldots < j_n$ such that $s_1 \subseteq t_{j1}, s_2 \subseteq t_{j2}, \ldots, s_n \subseteq t_{jn}$. For sequences of simple items the above condition translates to $s_1 = t_{j1}, s_2 = t_{j2}, \ldots, s_n = t_{jn}$. For example, sequences <13> and <124> are subsequences of <1234>, while <31> is not. When mining market-basket sequential patterns, users often want to place a bound on the maximum distance between the occurrence of adjacent pattern elements in a data sequence. For example, if a customer buys bread today and milk after a couple of weeks then the two purchases should probably not be seen as being correlated. Sequence s is thus defined to be a subsequence with a maximum distance constraint of δ, or alternately δ-distance subsequence, of t if there exist integers $j_1 < j_2 < \ldots < j_n$ such that $s_1 \subseteq t_{j1}, s_2 \subseteq t_{j2}, \ldots, s_n \subseteq t_{jn}$ and $j_k - j_{k-1} \leq \delta$ for each k=2, 3, ..., n. That is, occurrences of adjacent elements of s within t are not separated by more than δ elements. As a special case of the above definition, s is a contiguous subsequence of t if s is a 1-distance subsequence of t, i.e., the elements of s can be mapped to a contiguous segment of t.

A sequence s is said to contain a sequence p, if p is a subsequence of s (or, δ-distance subsequence) of s. (The notion of "subsequence" used should always be clear from the context.) The support of a sequential pattern p is defined as the fraction of the sequences in the input database that contain p. Given a set of sequences S, s∈S is maximal if there are no sequences in S−{s} that contain it.

A RE constraint R is specified as a RE over the alphabet of sequence elements using the established set of RE operators, such as disjunction (|) and Kleene closure (*). Thus, a RE constraint R specifies a language of strings over the element alphabet or, equivalently, a regular family of sequential patterns that is of interest to the user. A well-known result from complexity theory states that REs have exactly the same expressive power as deterministic finite automata. Thus, given any RE R, a deterministic finite automaton $A_R$ can be built such that $A_R$ accepts exactly the language generated by R. Informally, a deterministic finite automaton is a finite state machine with (a) a well-defined start state (denoted by a) and one or more accept states, and (b) deterministic transitions across states on symbols of the input alphabet (in our case, sequence elements). A transition from state b to state c on element $s_i$ is denoted by $$b \xrightarrow{s_1} c.$$

Figure 10:
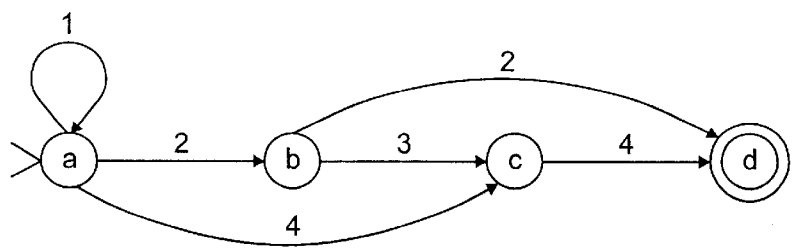
FIG. 10 depicts the state diagram of a deterministic finite automaton for the RE 1 * (22|234|44).

The shorthand $$b \xRightarrow{s_1} c$$

is also used to denote the sequence of transitions on the elements of sequences starting at state b and ending in state c. A sequence s is accepted by $A_R$ if following the sequence of transitions for the elements of s from the start state results in an accept state. FIG. 10 depicts a state diagram of a deterministic finite automaton for the RE 1* (22 |23 4|44) (i.e., all sequences of zero or more 1's followed by 22, 234, or 44). Double circles are used to indicate an accept state and to emphasize the start state (a) of the automaton. For brevity, "automaton" is used as a synonym for "deterministic finite automaton".

In an input database of sequences, a sequential pattern is defined to befrequent if its support in the database exceeds a user-specified minimum support threshold. A sequence s is said to be legal with respect to state b of automaton $A_R$ if every state transition in $A_R$ is defined when following the sequence of transitions for the elements of s from b. A sequence s is said to be valid with respect to state b of automaton $A_R$ if s is legal with respect to b and the final state of the transition path from b on input s is an accept state of $A_R$. It is said that s is valid if s is valid with respect to the start state a of $A_R$ (or, equivalently, if s is accepted by $A_R$). Informally, a sequence is legal (resp. valid) with respect to some state if its list of elements defines a proper transition path (resp. transition path to an accept state) in the automaton, starting from that state. The following example helps in illustrating the use of these terms.

Considering the RE constraint R=1* (22|234|44) and the automaton $A_R$, shown in FIG. 10, sequence <123> is legal with respect to state a and sequence <34> is legal with respect to state b, while sequences <134> and <24> are not legal with respect to any state of $A_R$. Similarly, sequence <34> is valid with respect to state b (since $$b \xRightarrow{<3,4>} d$$

and d is an accept state), however it is not valid, since it is not valid with respect to the start state a of $A_R$. Examples of valid sequences include <1122> and <234>.

Having established the necessary notions and terminology, stated abstractly, the present invention used constrained pattern mining to find all frequent and valid sequential patterns in D when given a database of sequences D, a user-specified minimum support threshold, and a user-specified RE constraint R (or, equivalently, an automaton $A_R$). Thus, the present invention efficiently mines patterns that are not only frequent but also belong to the language of sequences generated by the RE R. It should be noted the present invention can readily handle a set of RE constraints by collapsing them into a single RE.

Overall Technique

The general framework using C as an abstract user specified constraint on the patterns has just been described. (For the purposes of this discussion, C is essentially the RE constraint.) FIG. 1 is a high level flow chart showing the technique of the present invention. At step S100, constraint C is relaxed by inducing a weaker (i.e., less restrictive)

constraint C'. Intuitively, constraint C' is weaker than C if every sequence that satisfies C also satisfies C'. The "strength" of C' (i.e., how closely it emulates C) essentially determines the degree to which the user-specified constraint C is pushed inside the pattern mining computation. The choice of C' differentiates among the different techniques of the present invention and leads to various tradeoffs that are discussed below.

At step S110, the set F of frequent items in the database of interest that satisfy previously determined relaxed constraint C' are identified. At step S120, the pattern discovery loop is commenced. By definition, a sequence contains at least two items. Accordingly, in step S120 k is initialized at one, and incremented by one in step S125.

At step S130, the candidate generation phase of each pass of the pattern discovery loop, an initial set of candidate k-sequences $C_k$ is produced that satisfies C' by appropriately extending or combining sequences in F.

In step S140, the candidate pruning phase of pass k of the pattern discovery loop, pruning is generally accomplished by deleting from $C_k$ all candidate k-sequences containing at least one subsequence that satisfies C' and does not appear in F. Mathematically, this step may be depicted as let P:={s∈$C_k$: s has a subsequence t that satisfies C' and t∉F} and $C_k$:=$C_k$−P.

In the candidate generation and pruning process, the minimum support requirement and any additional user-specified constraints are preferably employed to restrict the set of candidate k-sequences counted during pass k. The techniques of the present invention preferably use two different types of pruning within each pass k. The first type of pruning is constraint-based pruning using a relaxation C' of the user-specified constraint C; that is, ensuring that all candidate k-sequences in $C_k$ satisfy C'. This is preferably accomplished by appropriately employing C' and F in the candidate generation phase (Step 130). The second type of pruning is support-based pruning; that is, ensuring that all subsequences of a sequence s in $C_k$ that satisfy C' are present in the current set of discovered frequent sequences F. Even though all subsequences of s must in fact be frequent, only the minimum support constraint for subsequences that satisfy C' can be checked since only these are retained in F.

Constraint-based pruning tries to restrict $C_k$ by (partially) enforcing the input constraint C, whereas support-based pruning tries to restrict $C_k$ by checking the minimum support constraint for qualifying subsequences. Given a set of candidates $C_k$ and a relaxation C' of C, the amount of support-based pruning is maximized when C' is anti-monotone (i.e., all subsequences of a sequence satisfying C') are guaranteed to also satisfy C'. This is because support information for all of the subsequences of a candidate sequence s in $C_k$ can be used to prune it. However, when C' is not anti-monotone, the amounts of constraint-based and support-based pruning achieved vary depending on the specific choice of C'. Thus, in accordance with the technique of the present invention, at the end of pass k, $F_k$ is exactly the set of all frequent k-sequences that satisfy the constraint C'.

Given a set of candidate k-sequences $C_k$, counting support for the members of $C_k$ (Step S150) can be performed efficiently by employing specialized search structures, like the hash tree, for organizing the candidates. See Srikant et al., "Mining sequential Patterns: Generalizations and Performance Improvements", Proc. of the Fifth International Conference on Extending Database Technology (EDBT '96), Avignon, France, March 1996, which is hereby incorporated by reference. The candidate counting step is typically the most expensive step of the pattern mining process and its overhead is directly proportional to the size of $C_k$. Thus, at an abstract level, the goal of an efficient pattern mining strategy is to employ constraint based and support based pruning to restrict as much as possible the set of set candidate k-sequences $C_k$, counted during pass k.

Incorporating C' in candidate generation and pruning also impacts the terminating condition for the pattern discovery loop in step S160. Finally, since at the end of the loop, F contains frequent patterns satisfying the induced relaxed constraint C', an additional filtering step may be required as part of outputting the sequences in F that satisfy C'. (Step S170).

The user-specified constraint C of this invention is a RE which not anti-monitone. Further RE's do not admit any non trivial anti-monitone relaxations C'.

Pushing Non-Anti Monitone Constraints Inside the Mining Process

If C is anti-monotone, the most effective way of using C to prune candidates is to push C "all the way" inside the mining computation. In the context of the techniques of the present invention, this means using C as is (rather than some relaxation of C) in the pattern discovery loop. The optimality of this solution for anti-monotone C stems from two observations. First, using C clearly maximizes the amount of constraint-based pruning since the strongest possible constraint (i.e., C itself) is employed. Second, since C is anti-monotone, all subsequences of a frequent candidate k-sequence that survives constraint-based pruning are guaranteed to be in F (since they also satisfy C). Thus, using the full strength of an anti-monotone constraint C maximizes the effectiveness of constraint-based pruning as well as support-based pruning. An additional benefit of using anti-monotone constraints is they significantly simplify the candidate generation and candidate pruning tasks. More specifically, generating $C_k$ is nothing but an appropriate "self-join" operation over $F_{k-1}$ and determining the pruned set p (Step S130) is simplified by the fact that all subsequences of candidates are guaranteed to satisfy the constraint.

When C is not anti-monotone, however, things are not that clear-cut. A simple solution, suggested by Ng et al., "Exploratory Mining and Pruning Optimizations of Constrained Association Rules", Proc. of the 1998 ACM SIGMOD International Conference on Management of Data, Seattle, Washington, June 1998, for itemset constraints, is to take an anti-monotone relaxation of C and use that relaxation for candidate pruning. Nevertheless, this simple approach may not always be feasible. For example, in accordance with the present invention the RE constraints for sequences do not admit any non-trivial anti-monotone relaxations. In such cases, the degree to which the constraint C is pushed inside the mining process (i.e., the strength of the (non anti-monotone) relaxation C' used for pruning) impacts the effectiveness of both constraint-based pruning and support-based pruning in different ways. More specifically, while increasing the strength of C' obviously increases the effectiveness of constraint-based pruning, it can also have a negative effect on support-based pruning. The reason is that, for any given sequence in $C_k$ that survives constraint-based pruning, the number of its subsequences that satisfy the stronger, non anti-monotone constraint C' may decrease. Only subsequences that satisfy C' can be used for support-based pruning, since this is the only "state" maintained from previous passes (in F).

Pushing a non anti-monotone constraint C' in the pattern discovery loop can also increase the computational complexity of the candidate generation and pruning tasks. For candidate generation, the fact that C' is not anti-monotone means that some (or, all) of a candidate's subsequences may be absent from F. In some cases, a "brute-force" approach (based on just C') may be required to generate an initial set of candidates $C_k$. For candidate pruning, computing the subsequences of a candidate that satisfy C' may no longer be trivial, implying additional computational overhead. Candidate generation and pruning, however, are inexpensive CPU-bound operations that typically constitute only a small fraction of the overall computational cost. Thus, the major tradeoff that needs to be considered when choosing a specific C' from among the spectrum of possible relaxations of C is the extent to which that choice impacts the effectiveness of constraint-based and support-based pruning. The objective, of course, is to strike a reasonable balance between the two different types of pruning so as to minimize the number of candidates for which support is actually counted in each pass.

The Preferred Techniques

In accordance with the present invention, there are four preferred techniques or algorithms for relaxing the user-specified RE constraint C≡R to be used in constrained pattern mining. Each algorithm or technique implements a different preferred relaxation. Essentially, the four techniques represent a natural progression, with each technique or algorithm pushing a stronger relaxation of R than its predecessor in the pattern mining loop. The selected technique impacts upon how the candidate pruning step is undertaken.

The first algorithm, termed SPIRIT(N) ("N" for Naive) and implementing preferred relaxed constraint N, employs the weakest relaxation of R—it only prunes candidate sequences containing elements that do not appear in R. The second algorithm, termed SPIRIT(L) ("L" for Legal) and implementing preferred relaxed constraint L, requires every candidate sequence to be legal with respect to some state of $A_R$. The third algorithm, termed SPIRIT(V) ("V" for Valid) and implementing preferred relaxed constraint V, goes one step further by filtering out candidate sequences that are not valid with respect to any state of $A_R$. Finally, the SPIRIT(R) algorithm ("R" for Regular) and implementing preferred relaxed constraint R, essentially pushes R "all the way" inside the mining process by counting support only for valid candidate sequences, i.e., sequences accepted by $A_R$. The following table summarizes the constraint choices for each of the four preferred relaxed constraint within the flow chart set forth in FIG. 1.

| Algorithm | Input Constraint C | Relaxed Constraint C' |
|---|---|---|
| SPIRIT(N) | RE constraint R | all elements appear in R |
| SPIRIT(L) | RE constraint R | legal wrt some state of $A_R$ |
| SPIRIT(V) | RE constraint R | valid wrt some state of $A_R$ |
| SPIRIT(R) | RE constraint R | valid, i.e., C'≡R |

Of the four algorithms, SPIRIT(N) is the only one employing an anti-monotone (and, trivial) relaxation C'. The progressive increase in the strength of C' implies a subset relationship between the frequent sequences determined for each pass k; that is, $$F_k^{SPIRIT(R)} \subseteq F_k^{SPIRIT(V)} \subseteq F_k^{SPIRIT(L)} \subseteq F_k^{SPIRIT(N)}$$

Figures 2A, 2B:
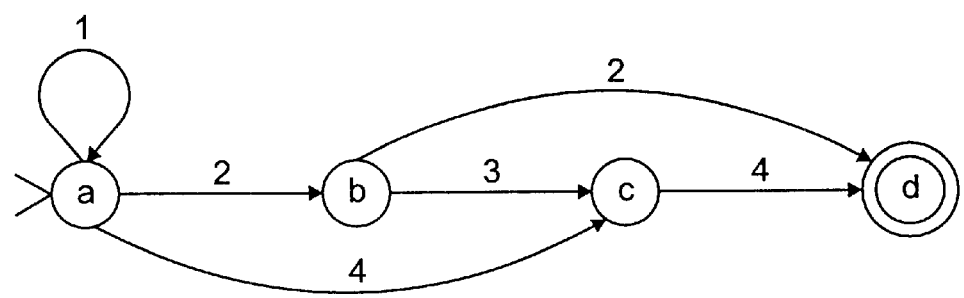

Referring now to FIG. 2, the set of sequences D shown in FIG. 2(a) and the automaton $A_R$ depicted in FIG. 2(b) for R=1* (22|234|44) will be considered. Letting the minimum support threshold be 0.4; thus, a frequent sequence must be contained in at least two sequences in the data set. FIGS. 2(c), (d), (e), and (f) illustrate the sets of candidate sequences $C_k$ for which support is computed in accordance with the present invention using each of the four preferred relaxed constraints. The details of the candidate generation and pruning phases for each preferred relaxed constraint are discussed below. The support counts for each candidate in $C_k$ and the frequent sequences in $F_k$ are also shown. For sequences generated by SPIRIT(L) and SPIRIT(V), the corresponding state of $A_R$ is also specified.

Even though the frequent sets $F_k$ obviously satisfy the subset relationship mentioned above, the same does not necessarily hold for the candidate sets $C_k$. For instance, in FIG. 2, both SPIRIT(V) and SPIRIT(R) generate the sequence <1234> that is not generated by either SPIRIT(N) or SPIRIT(L). This is a direct consequence of the constraint-based vs. support-based pruning tradeoff for non anti-monotone constraints.

SPIRIT(N) simply requires that all elements of a candidate sequence s in $C_k$ appear in the RE R. SPIRIT(L) uses the automaton $A_R$ to prune from $C_k$ candidate k-sequences that are not legal with respect to any state of $A_R$. In describing SPIRIT(L), $F_k(b)$ is used to denote the set of frequent k-sequences that are legal with respect to state b of $A_R$. SPIRIT(V) uses a stronger relaxed constraint C' than SPIRIT(L) during candidate generation and pruning. More specifically, SPIRIT(V) requires every candidate sequence to be valid with respect to some state of $A_R$. In describing SPIRIT(V), $F_k(b)$ is used to denote the set of frequent k-sequences that are valid with respect to state b of $A_R$. SPIRIT(R) essentially pushes the RE constraint R "all the way" inside the pattern mining computation, by requiring every candidate sequence for which support is counted to be valid (i.e., $C^1 \equiv R$).

Candidate Generation

Figure 3:
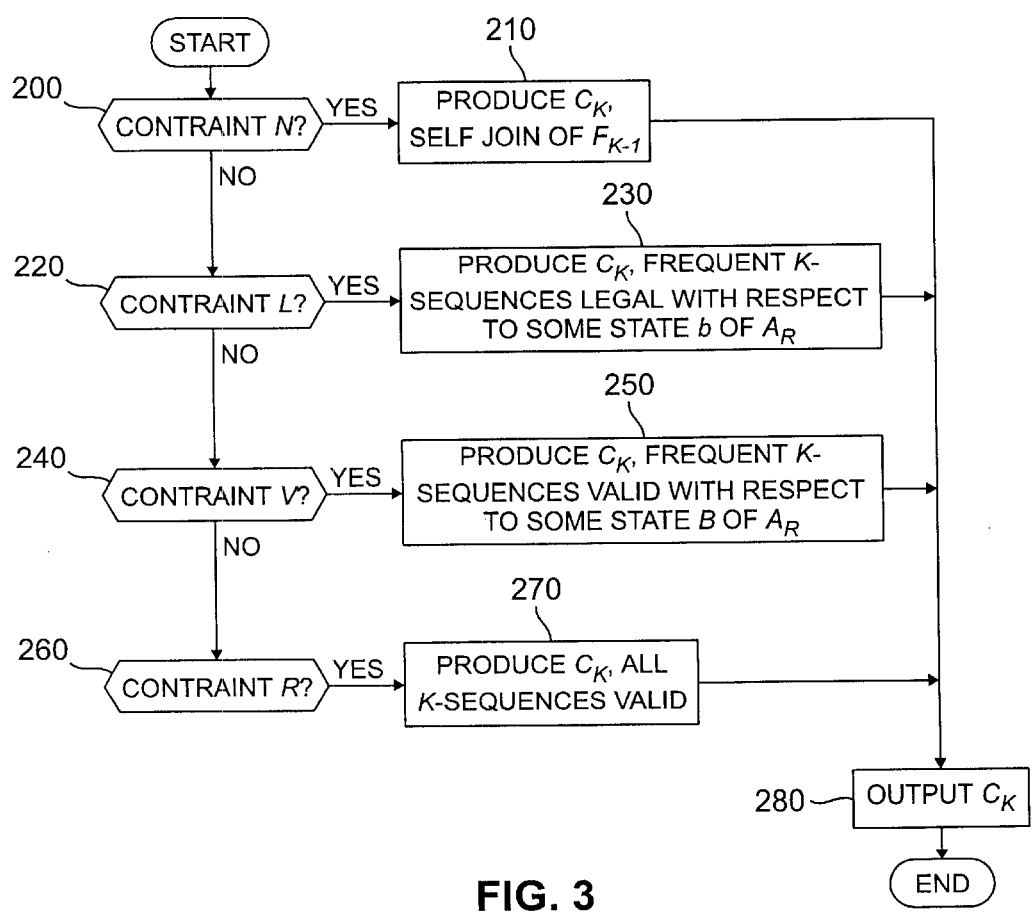
FIG. 3 is a high level flow chart describing the process of candidate generation. This figure may also be considered a detailed description of step S130 of FIG. 1.

FIG. 3 is a high level flow chart of the process of generating the candidate set $C_k$. FIG. 3 is also a detailed description of step S130 of FIG. 1. In step S200, it is determined if the relaxed constraint selected is constraint N. If so, in step S210 candidate set $C_k$ is produced. The constraint simply requires that all elements of a candidate sequence s in $C_k$ appear in the RE R. This constraint is anti-monotone. Candidate generation is performed as follows: for every pair of (k–1)-sequences s and t in $F_{k-1}$, if $s_{j+1} = t_j$ for all $1 \leq j \leq k-2$, then <s $t_{k-1}$> is added to $C_k$. This is basically a self-join of $F_{k-1}$, the join attributes being the last k–2 elements of the first sequence and the first k–2 elements of the second.

In step S220, it is determined if the relaxed constraint selected is L. If so, in step S230 candidate set $C_k$ is produced and outputted in Step S280, by adding to $C_k$, for each state b in $A_R$, candidate k-sequences that are legal with respect to b and have the potential to be frequent. Considering a k-sequence s, <$s_1 \ldots s_k$>, that is legal with respect to state b in $A_R$, where $$b \xrightarrow{s_1} c$$

is a transition in $A_R$, for s to be frequent, <$s_1 \ldots s_{k-1}$> must be in $F_{k-1}(b)$ and <$s_2 \ldots s_k$> must be in $F_{k-1}(c)$. Thus, the candidate sequences for state b can be computed as follows. For every sequence s in $F_{k-1}(b)$, $$b \xrightarrow{s_1} c$$

is a transition in $A_R$. For every sequence t in $F_{k-1}(c)$ such that $s_{j+1}=t_j$ for all $1 \leq j \leq k-2$, the candidate sequence $<s\ t_{k-1}>$ is added to $C_k$. This is basically a join of $F_{k-1}(b)$ and $F_{k-1}(c)$, on the condition that the (k−2)-length suffix of s $\epsilon F_{k-1}(b)$ matches the (k−2)-length prefix of t $\epsilon F_{k-1}(c)$ and $$b \xrightarrow{s_1} c$$

is a transition in $A_R$.

In step S240, it is determined if the relaxed constraint selected is V. If so, in step S250 candidate set $C_k$ is produced and outputted in Step S280. Since every candidate sequence s, $<s_1 \ldots s_k>$, in $C_k$ is required to be valid with respect to some state b, the (k−1)-length suffix of s is both frequent and valid with respect to state c, where $$b \xrightarrow{s_1} c$$

is a transition in $A_R$. Thus, given a state b of $A_R$, the set of potentially frequent and valid k-sequences with respect to b can be generated using the following rule: for every transition $$b \xrightarrow{s_1} c,$$

for every sequence t in $F_{k-1}(c)$, add $<s_1 t>$ to the set of candidates for state b. The set $C_k$ is simply the union of these candidate sets over all states b of $A_R$.

In step S260, it is determined if the relaxed constraint selected is R. If so, in step S270 candidate set $C_k$ is produced and outputted in Step S280. Since F contains only valid and frequent sequences, there is no efficient mechanism for generating candidate k-sequences other than a "brute force" enumeration using the automaton $A_R$. The states and transitions of $A_R$ enumerating all paths of length k that begin with the start state and end at an accept state are traversed. Obviously, each such path corresponds to a valid k-sequence containing the elements that label the transitions in the path. (The terms "path" and "sequence" are used interchangeably herein.) Two optimizations are preferably employed to improve the efficiency of the this exhaustive path enumeration scheme. The first optimization uses the observation that, if a path of length less than k corresponds to a sequence that is valid but not frequent, then further extending the path is unnecessary since it cannot yield frequent k-sequences. The second optimization involves exploiting cycles in $A_R$ to reduce computation.

Consider a path $<t\ u>$ (of length less than k), such that both t and $<t\ u>$ result in the same state from the start state a. (That is, u corresponds to a cycle in $A_R$.) Then, if the path $<t\ u\ v>$ obtained as a result of extending $<t\ u>$ with v is to yield a candidate k-sequence, $<t\ v>$ is both frequent and valid. This observation is useful in the generation of candidate k-sequences $C_k$. Given a path $<t\ u>$ which satisfies these statements, $<t\ u>$ need only be extended with sequences v for which $<t\ v>$ belongs to $F_{|<t\ v>|}$ (since the length of $<t\ v>$ is less than k). Algorithm GENCANDIDATES, set forth below,

```
Procedure GENCANDIDATES(s,b,B)
begin
1.      for each transition b --w_i--> c in A_R do {
2.          if (|s| = k − 1 and c is an accept state) C_k = C_k ∪ {< s w_i >}
3.          if (|s| ≠ k − 1 and (c is not an accept state or < s w_i >∉ F)) }
4.              if (c ∈ B) {
5.                  let s = < tu >, where t is the prefix of s for which b ⇒t c
6.                  C_k := C_k ∪ {< t u w_i v >:< t v >∈ F_{k|u|−1}}
7.              }
8.              else GENCANDIDATES(< s w_i >, c, B ∪ {b})
9.          }
10.     }
end
``` preferably uses these observations in the computation of $C_k$. The algorithm enumerates paths by recursively invoking itself every time it traverses a transition of $A_R$. The input parameters to GENCANDIDATES are (1) s, the sequence corresponding to the transitions traversed so far, (2) the current state b, which is also the state that results when the path s is traversed from the start state a of $A_R$, and (3) B, the set of states visited when s is traversed starting from a. In order to compute the set of candidates $C_k$ for constraint R, algorithm GENCANDIDATES is invoked with input parameters s=$\epsilon$ (the empty sequence), b=a, and B={a}.

The first of the two prefered optimizations is performed in Step 3. If $<s\ w_i>$ is a valid sequence that is not frequent, then the edge labeled $w_i$ is not traversed further since no extension of $<s\ w_i>$ can be frequent either. The second optimization is applied in Steps 4–7. If $<s\ w_i>$ contains a cycle, then edge $w_i$ is not traversed any further. Instead, assuming s=$<t\ u>$, with $<u\ w_i>$ causing the cycle, the candidates that result from extending $<s\ w_i>$ are computed (Step 6).

An example of candidate generation using the R constraint is generation of candidate set $C_4$ in FIG. 2(f). At the start of the fourth pass, F contains the sequences $<22>$, $<122>$ and $<234>$. Since GENCANDIDATES is invoked with parameters $\epsilon$, a and {a}, for transition $$a \xrightarrow{1} a,$$

the optimization for cycles is used to generate candidates in Steps 5–6. Here, s=t=ε and $w_i$=1; thus, sequences v ∈ $F_3$ are appended to $w_i$ to generate candidates. Consequently, <1122> and <1234> are added to $C_4$.

Candidate Pruning

Figure 4:
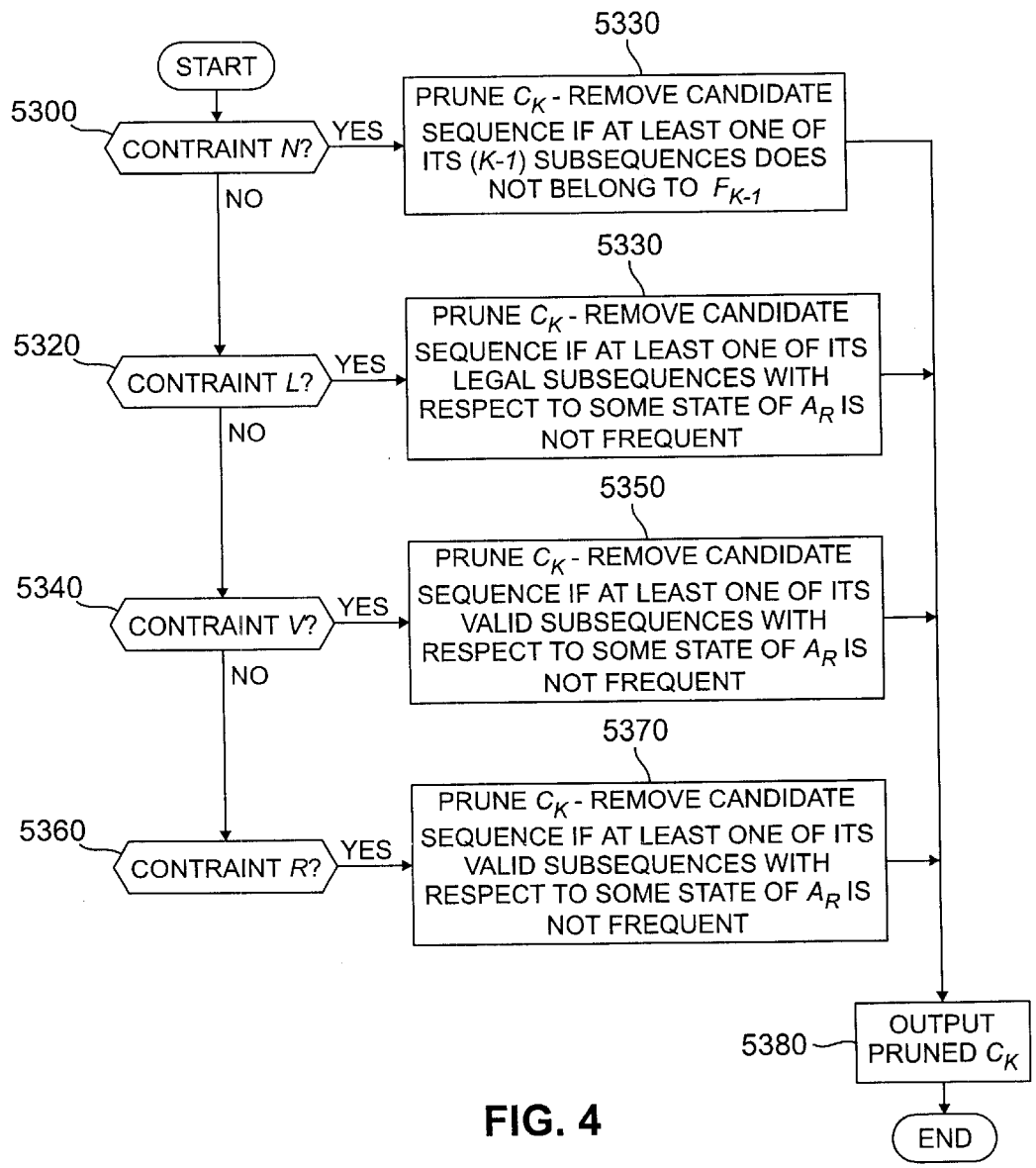
FIG. 4 is a high level flow chart describing the process of pruning the generated candidates. This figure may also be considered a detailed description of step S140 of FIG. 1.

FIG. 4 is a high level flow chart of the process of pruning the candidate set $C_k$. FIG. 4 is also a detailed description of step S140 of FIG. 1. In step S300, it is determined if the relaxed constraint selected is constraint N. If so, in step S310 candidate set $C_k$ is pruned. A candidate sequence s is pruned from $C_k$ if at least one of its (k−1)-subsequences does not belong to $F_{k-1}$.

In step S320, it is determined if the relaxed constraint selected is constraint L. If so, in step S330 candidate set $C_k$ is pruned and outputted in Step S380. Given a sequence s in $C_k$, the candidate generation step ensures that both its prefix and suffix of length k−1 are frequent. In order for s to be frequent, every subsequence of s must also be frequent. However, since support is only counted for sequences that are legal with respect to some state of $A_R$, s can be pruned from $C_k$ only if a legal subsequence of s is found that is not frequent (i.e., not in F). The candidate pruning procedure computes the set of maximal subsequences of s with length less than k that are legal with respect to some state of automaton $A_R$. If any of these maximal subsequences is not contained in F, then s is deleted from $C_k$.

An example of this pruning may be had by referring to the generation of candidate set $C_4$ in FIG. 2(d). For state a, $F_3(a)$={<112>, <122>, <123>, <234>}. For sequence <112>, the transition $$a \xrightarrow{1} a$$

is in $A_R$. Thus, since the first two elements of <122> and <123> match the last two elements of <112>, the sequences <122> and <123> are added to $C_4$. Similarly, sequence <1234> is also added to $C_4$ in the candidate generation step, but it is pruned in the candidate pruning step. This is because <1234> has a maximal legal subsequence (i.e., <14>) that is not frequent.

An algorithm for computing the maximal legal subsequences of a candidate sequence s will now be described. Let maxseq(b, s) denote the set of maximal subsequences of s that are legal with respect to state b of $A_R$. Then, if t=<$s_2$ ... $s_{|s|}$>, maxseq(b, s) can be computed from maxSeq(b, t) using the following relationship:

$$\max Seq(b, s) \subseteq \begin{cases} \max Seq(b, t) \cup \{\langle s_1 u \rangle : u \in \max Seq(c, t)\} \cup \{s_1\} & \text{if } b \xrightarrow{s_1} c \text{ is in a transition in } A_R \\ \max Seq(b, t) & \text{otherwise} \end{cases}$$

The intuition is that for a subsequence v ∈ maxseq(b, s), either (a) v does not involve $s_1$, in which case v is a maximal subsequence of t that is legal with respect to b, or (b) $v_1$=$s_1$ and <$v_2$ ... $v_{|v|}$> is a maximal subsequence of t with respect to state c. Based on the above recurrence, the following dynamic programming algorithm is preferred, termed FINDMAXSUBSEQ, for computing maxSeq(b, s) for all states b of $A_R$. Intuitively, FINDMAXSUBSEQ works by computing the set maxSeq for successively longer suffixes of the input sequence s, beginning with the suffix consisting of only the last element of s.

```
Procedure FINDMAXSUBSEQ(Start, End s)
begin
    1.    for each state b in automaton A_R do
    2.        maxSeq[b] := 0
    3.    for l := |s| down to 1 do {
    4.        for each state b in automaton A_R do {
    5.            tmpSeq[b] = 0
    6.            if (there exists a transition b →^{s_l} c in A_R) {
    7.                if(c ∈ End) tmpSeq[b] := {s_l}
    8.                tmpSeq[b] := tmpSeq[b]∪{< s_l t >: t ∈ maxSeq[c]}
    9.            }
   10.        }
   11.        for each state b in automaton A_R do {
   12.            maxSeq[b] := maxSeq[b] ∪ tmpSeq[b]
   13.            for each sequence t in maxSeq[b] do
   14.                if (there exists a sequence u in maxSeq[b] - {<s_1 ... s_{|s|} >} such that t is a subsequence of u)
   15.                    delete t from maxSeq[b]
   16.        }
   17.    }
   18.    return ∪_{b∈Start} maxSeq[b] - {s} (after deleting non-maximal sequences)
end
```

More specifically, given an input sequence s and two sets of states in $A_R$ (Start and End), algorithm FINDMAXSUBSEQ returns the set of all maximal subsequences t of s such that (a) the length of t is less than |s|, and (b) t is legal with respect to a state b in Start and if $$b \overset{t}{\Rightarrow} c,$$

then c ∈ End. In each iteration of the for loop spanning Steps 3–17, for each state b in $A_R$, maximal legal subsequences for the suffix $<s_l \ldots s_{|s|}>$ are computed and stored in maxSeq[b]. At the start of the $1^{th}$ iteration, maxSeq[b] contains the maximal subsequences of $<s_{l+1} \ldots s_{|s|}>$ that are both legal with respect to state b and result in a state in End. Thus, if a transition from b to c on element $s_1$ is in $A_R$, then the maximal legal subsequences for b comprise those previously computed for $<s_{l+1} \ldots s_{|s|}>$ and certain new sequences involving element $s_1$. These new sequences containing $s_1$ are computed in the body of the for loop spanning Steps 5–9 and stored in tmpSeq[b]. A point to note is that, since only maximal legal subsequences that result in a state in End are of interest, $s_1$ is added to tmpSeq[b] only if c ∈ End (Step 7).

After the new maximal subsequences involving $s_1$ are stored in tmpSeq[b] for every state b of $A_R$, they are added to maxSeq[h], following which, non-maximal subsequences in maxSeq[b] are deleted (Steps 11–16). In steps 13–15, care is taken not to consider $<s_l \ldots s_{|s|}>$ to delete other sequences in maxSeq[b] since maximal sequences whose length is less than |s| are of interest. If $<s_l \ldots s_{|s|}>$ were to be used to prune ofther subsequences, then it is possible that maxSeq[b] for a state b may only contain the sequence s which has length |s| and other maximal subsequences of length less than |s| may have been pruned by it. Finally, after maximal legal subsequences for the entire sequence s have been computed for all the states of $A_R$, only those for states in Start are returned (Step 18).

To recap, the candidate pruning procedure using relaxed constraint L invokes FINDMAXSUBSEQ to determine all the maximal legal subsequences of each candidate s in $C_k$, and deletes s from $C_k$ if any of these subsequences is not frequent. For relaxed constraint L, algorithm FINDMAXSUBSEQ is invoked with Start and End both equal to the set of all states in $A_R$.

Note that, given the candidate $s=<s_1 \ldots s_{\{k\}}>$ in $C_k$, algorithm FINDMAXSUBSEQ needs to check only the legal subsequences of s that start with $s_l$ and end with $s_k$. This is because all other legal subsequences of s are also legal subsequences of either $s=<s_1 \ldots s_{\{k-1\}}>$ or $s=<s_2 \ldots s_{\{k\}}>$ which are themselves frequent and legal (by the Candidate generation process). Thus, a possible optimization for SPIRIT(L) is to invoke algorithm FINDMAXSUBSEQ with $$\text{Start} = \{b: \text{the transition } b \overset{s_1}{\rightarrow} d \; A_R\}$$

and $$\text{End} = \{c: \text{the transition } d \overset{s_k}{\rightarrow} c \text{ is in } A_R\}.$$

(In the above example, this optimization implies that only subsequence <1~4> would be returned.)

The following table illustrates the maxSeq set for the various states of automaton $A_R$ (from FIG. 2(*b*)) and for decreasing values of l, when FINDMAXSUBSEQ is invoked with the relaxed constraint L with s=<1234>. Consider the final iteration, i.e., l=1. At the start of the iteration maxSeq[a] contains the sequences <4>, <23>, and <234>. Since $$a \overset{1}{\rightarrow} a,$$

sequences <1>, <14>, <123>, and <1234> are added to maxSeq[a] (Steps 7–8). Of these, sequences <1>, <4>, and <23> are deleted from maxSeq[a] since they are subsequences of <14> and <123> (Steps 14–15). The remaining subsequences stay in maxSeq[a], since <1234> cannot be used to prune non-maximal subsequences. Thus, the final set of maximal legal subsequences returned by FINDMAXSUBSEQ is {<14>, <123>, <234>}.

| l | maxSeq[a] | maxSeq[b] | maxSeq[c] |
|---|---|---|---|
| 4 | {<4>} | | {<4>} |
| 3 | {<4>} | {<3>,<34>} | {<4>} |
| 2 | {<4>,<23>,<234>} | {<2>,<34>} | {<4>} |
| 1 | {<14>,<123>,<234>,<1234>} | {<2>,<34>} | {<4>} |

Execution of FINDMAXSUBSEQ for s=<1234>

The computational overhead of candidate pruning for a candidate k-sequence s in $C_k$ using SPIRIT(L) can be significantly higher than that of using SPIRIT(N), whose candidate pruning step has a time complexity of $O_k$ (to determine the k subsequences of s). More specifically, the worst-case time complexity of computing the maximal legal subsequences of s using algorithm FINDMAXSUBSEQ can be shown to be $O(k^{2*}|A_R|*|\text{maxSeq}(s)|)$, where $|A_R|$ is the number of states in $A_R$ and |maxSeq(s)| is the number of maximal subsequences for s. To see this, note that the outermost for loop in Step 3 of FINDMAXSUBSEQ is executed k times. The time complexity of the first for loop in Step 4 is $O(k*|A_R| |\text{maxSeq}(s)|)$, while that of the second for loop in Step 11 is $O(k*|A_R|*|\text{maxSeq}(s)|)$, since maxSeq [b] can be implemented as a tire, for which insertions, deletions, and subsequence checking for k-sequences can all be carried out in O(k) time.

The higher time complexity of candidate pruning in SPIRIT(L) is not a major efficiency concern since (a) the overhead of candidate generation and pruning is typically a tiny fraction of the cost of counting supports for candidates in $C_k$, and (b) in practice, |maxSeq(s)| can be expected to be small for most sequences. In the worst case, however, for a k-sequence, |maxSeg(s)| can be $O(2^k)$. This worst case scenario can be avoided by imposing an a-priori limit on the size of maxseq[b] in FINDMAXSUBSEQ and using appropriate heuristics for selecting victims (to be ejected from maxSeq[b]) when its size exceeds that limit.

The space overhead of using SPIRIT(L) may also be greater than that of SPIRIT(N). SPIRIT(N) only utilizes $F_{k-1}$ for the candidate generation and pruning phases during the $k^{th}$ pass. In contrast, the candidate pruning step of SPIRIT (L) requires F to be stored in main memory since the maximal legal subsequences of a candidate k-sequence may be of any length less than k. However, this should not pose a serious problem since each $F_k$ computed by SPIRIT(L) contains only frequent and legal k-sequences, which are typically few compared to all frequent k-sequences. In addition, powerful servers with several gigabytes of memory are now fairly commonplace. Thus, in most cases, it should be possible to accommodate all the sequences in F in main memory. In the occasional event that F does not fit in memory, one option would be to only store $F_{k-1}, \ldots, F_{k-l}$ for some $l \geq 1$. Of course, this means that maximal subsequences whose length is less than k−l cannot be used to prune candidates from $C_k$ during the candidate pruning step.

In step S340, it is determined if the relaxed constraint selected is constraint V. If so, in step S350 candidate set $C_k$ is pruned and outputted in Step S380. The pruning phase of SPIRIT(V) is very similar to that of SPIRIT(L) (Step S330), except that only valid (rather that legal) subsequences of a candidate can be used for pruning. More specifically, given a candidate sequence s in $C_k$, all maximal subsequences of s are computed that are valid with respect to some state of $A_R$ and have length less than k. This is done by invoking algorithm FINDMAXSUBSEQ with Start equal to the set of all states of $A_R$ and End equal to the set of all accept states of $A_R$. If any of these subsequences is not contained in F, then s is deleted from $C_k$. (Again, a possible optimization for SPIRIT(V) is to use $$\text{Start} = \left\{b: \text{ the transition } b \xrightarrow{s_1} d \text{ is in } A_R\right\}.$$

For example, consider the generation of candidate set $C_4$ in FIG. 2(e). For state a, $F_3(a)$ contains the sequences <123> and <234>. Since $$a \xrightarrow{1} a$$

is a transition in $A_R$, sequences <123> and <1234> are added to $C_4$ in the candidate generation step. Note that the sequence <1234> in $C_4$ in FIG. 2(e) is not pruned since it has only one maximal valid subsequence, <234>, which is frequent. The same candidate sequence was deleted in the pruning step of SPIRIT(L) because one of its legal subsequences, <14>, was not frequent.

In step S360, it is determined if the relaxed constraint selected is constraint R. If so, in step S370 candidate set $C_k$ is pruned and outputted in Step S380. A candidate sequence s in $C_k$ can be pruned if a valid subsequence of s is not frequent. The maximal valid subsequences of s can be computed by invoking algorithm FINDMAXSUBSEQ with Start equal to {a} (the start state of $A_R$) and End equal to the set of all accept states of $A_R$.

Terminating Conditions

Figure 5:
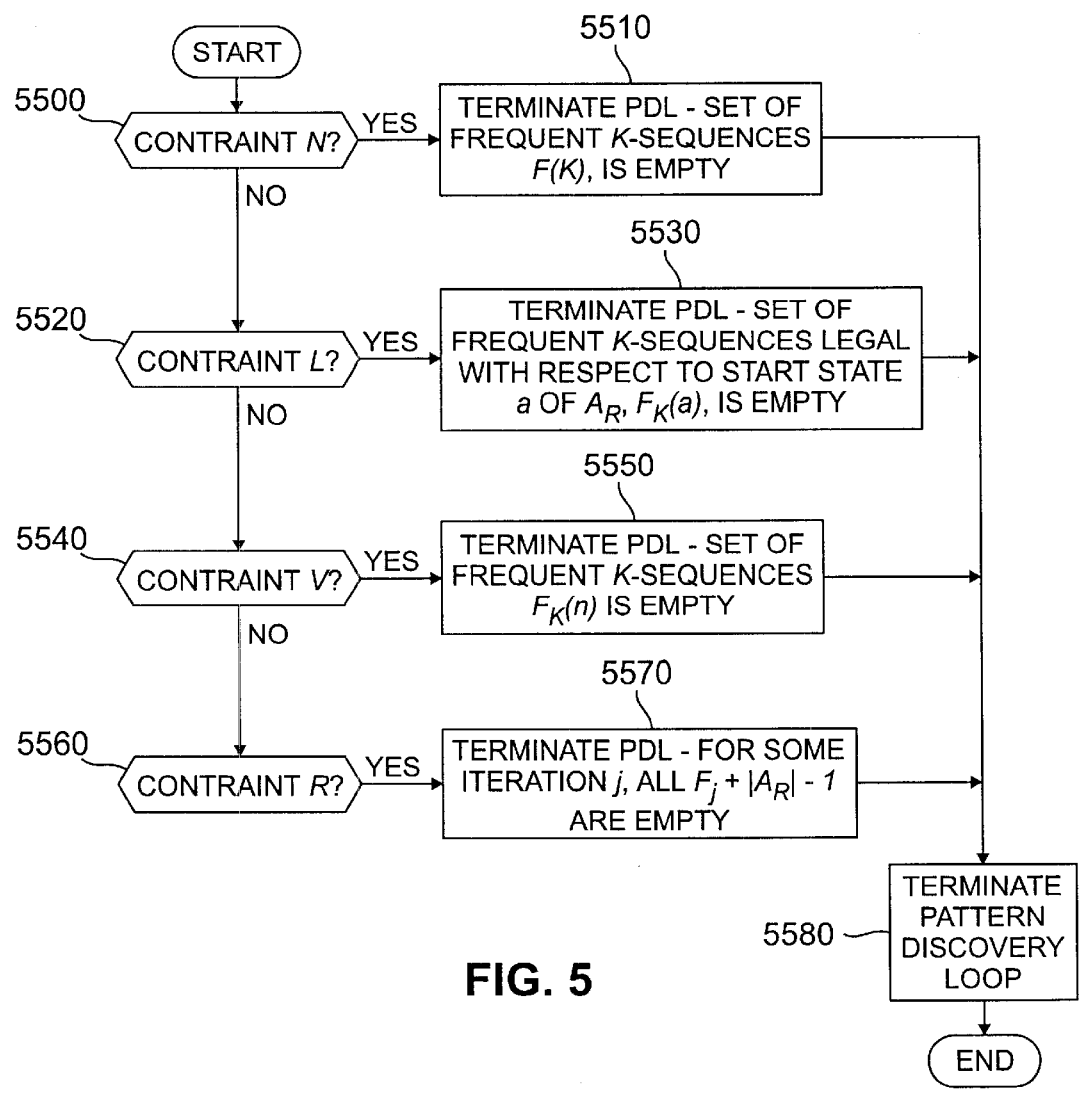
FIG. 5 is high level flow chart describing the process of terminating the pattern discovery loop. This figure may also be considered a detailed description of step S160 of FIG. 1.

Referring now to FIG. 5, FIG. 5 is a high level flow chart of the process of identifying the terminating conditions to be used in determining whether to terminate the pattern discovery loop in FIG. 1. FIG. 5 is also a detailed description of step S160 of FIG. 1. In step S500, it is determined if the relaxed constraint selected is constraint N. If so, in step S510 it is determined if the set of frequent k-sequences, $F_k$, is empty. If so, the pattern discovery loop is terminated in Step S580.

In Step S520, it is determined if the relaxed constraint selected is L. If so, in Step S530 it is determined if the set of frequent k-sequences that are legal with respect to the start state a of $A_R$ is empty; that is, $F_k(a)$ is empty. If so, the pattern discovery loop is terminated in Step S580.

In Step S540, it is determined if the relaxed constraint selected is V. If so, in Step S550 it is determined if the set of frequent k-sequences $F_k$ is empty. If so, the pattern discovery loop is terminated in Step S580. SPIRIT(V), unlike SPIRIT(L), cannot be terminated based on just $F_k(a)$ becoming empty (where a is the start state of $A_R$). The reason is that, even though there may be no frequent and valid sequences of length k for a, there could still be longer sequences that are frequent and valid with respect to a.

In Step S560, it is determined if the relaxed constraint selected is R. If so, in Step S570 it is determined if for some iteration j, $F_j, \ldots, F_{j+|A_R|-1}$ are all empty, where $|A_R|$ is the number of states in automaton $A_R$. To see this, consider any frequent and valid sequence s whose length is greater than $j+|A_R|-1$. Obviously, s contains at least one cycle of length at most $|A_R|$ and, therefore, s must contain at least one frequent and valid subsequence of length at least j. However, no valid sequence with length greater than or equal to j is frequent (since $F_j, \ldots, F_{j+|A_R|-1}$ are all empty). Thus, s cannot be a frequent and valid sequence. If so, the pattern discovery loop is terminated in Step S580.

Generalization to Itemset Sequences

For sequences whose elements are itemsets, the notion of subsequence is slightly different compared to when elements are simple items. The definition of a frequent sequence, however, is the same—an itemset sequence is frequent if the fraction of data sequences containing it exceeds the minimum support threshold.

Similarly, the syntax of RE constraints and the notion of valid sequences need to be extended when sequence elements are itemsets. The RE constraint R for itemset sequences has itemsets (containing at least one item) serving as its basic building blocks. Consequently, transitions between states of automaton $A_R$ for R are on itemsets. Defining an itemset sequence $s=<s_1 \ldots s_n>$ to be a restriction of another sequence $t=<t_1 \ldots t_n>$ containing the same number of elements, if $s_1 \subseteq t_1, \ldots s_n \subseteq t_n$, an itemset sequence s is valid if some restriction of it satisfies the RE constraint R. Given this definition, the pattern mining problem for itemset sequences is essentially the same as before: find all itemset sequences that are both frequent and valid.

Figures 6A, 6B, 6C:
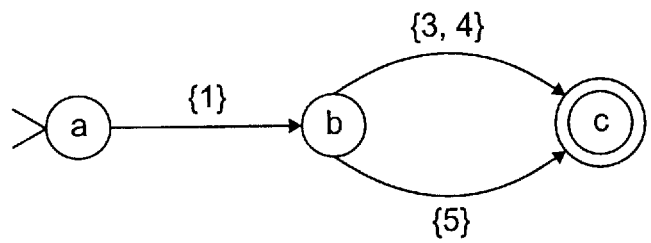
FIGS. 6(a)–(c) show a data set of sequences, an automaton, and a set of candidate sequences.

Referring now to FIG. 6, FIG. 6(a) shows a data set and FIG. 6(b) shows automaton $A_R$ for R={1}({3, 4}|{5}). In $A_R$, $$a \xrightarrow{\{1\}} b \text{ and } a \xrightarrow{\{1\}\{3,4\}} c.$$

For a minimum support threshold of 0.6 and this RE constraint, the frequent and valid sequences are as shown in FIG. 6(c). The itemset sequence <{1, 2}{4, 5}> is valid because one of its restrictions <{1}{5}> satisfies R. Sequences <{1, 2}{3}> and <{2}{3, 4}> are examples of frequent sequences that are not valid.

Note the definition of a valid sequence in terms of its restriction is both powerful and general. For instance, all the frequent itemset sequences for the data set in FIG. 6(a) can be computed by choosing R to be ({1}|{2}|{3}|{4}|{5})* (since for this R, every sequence is valid). The disclosure now turns to a description of how the SPIRIT(L), SPIRIT (V), and SPIRIT(R) algorithms of the present invention can be extended to handle itemset sequences. The details for SPIRIT(N) are omitted, since they follow directly from the GSP algorithm of Srikant and Agrawal, Mining Sequential Patterns: Generalizations and Performance Improvements, Proceedings of the Fifth International Conference on Extending Database Technology (EDBT'96), Avignon, France, March, 1996, which is hereby incorporated by reference.

For itemset sequences, in the $k^{th}$ pass of the SPIRIT(L) algorithm or technique of the present invention, the set $C_k$ consists of all candidate k-item sequences for which support is counted, where a k-item sequence is an sequence containing exactly k items. Given a state b in $A_R$, a sequence s is defined to be semi-legal with respect to b if there exists a restriction t, of $<s_1 \ldots s_{|s|-1}>$ and state c with the following properties: (1)

$$b \xrightarrow{t} c,$$

and (2) there is a transition out of c for an itemset $w_i$ such that either $w_i \subseteq s_{|s|}$ or $s_{|s|} \subseteq w_i$. During pass k, SPIRIT(L) stores in $F_k$ all the frequent k-item sequences that are semi-legal with respect to some state of $A_R$. This set in fact subsumes all legal and frequent sequences. While details of candidate generation and pruning steps are discussed below, it should be noted that sequences in $F_{k-1}$ that are semi-legal with respect to a state b are stored in $F_{k-1}(b)$.

For itemset sequences, in the SPIRIT(V) algorithm or technique of the present invention for a state b in $A_R$, a sequence s is defined to be semi-valid with respect to b if there exists a restriction t of $<s_1 \ldots s_{|s|-1}>$ and a state c with the following properties: (1)

$$b \xRightarrow{t} c,$$

and (2) there is a transition $$c \xrightarrow{w_i} d$$

out of c such that either $w_i \subseteq s_{|s|}$ or $s_{|s|} \subseteq w_i$, and d is an accept state of $A_R$. SPIRIT(V) stores in $F_k$ all frequent k-item sequences that are also semi-valid with respect to some state of $A_R$.

For itemset sequences, in the SPIRIT(R) algorithm or technique of the present invention frequent and valid k-item sequences are stored in $T_k$ during the $k^{th}$ pass. Sequences $<w_1 \ldots w_j>$ that can be derived by concatenating the sequence of transitions from the start state to an accept state are referred to as base sequences. Sequences that are derived from a base sequence by adding items to itemsets in the base sequence are referred to as derived sequences. Note that it is possible for a sequence to be both a base sequence as well as a derived sequence.

Candidate Generation

Figure 7:
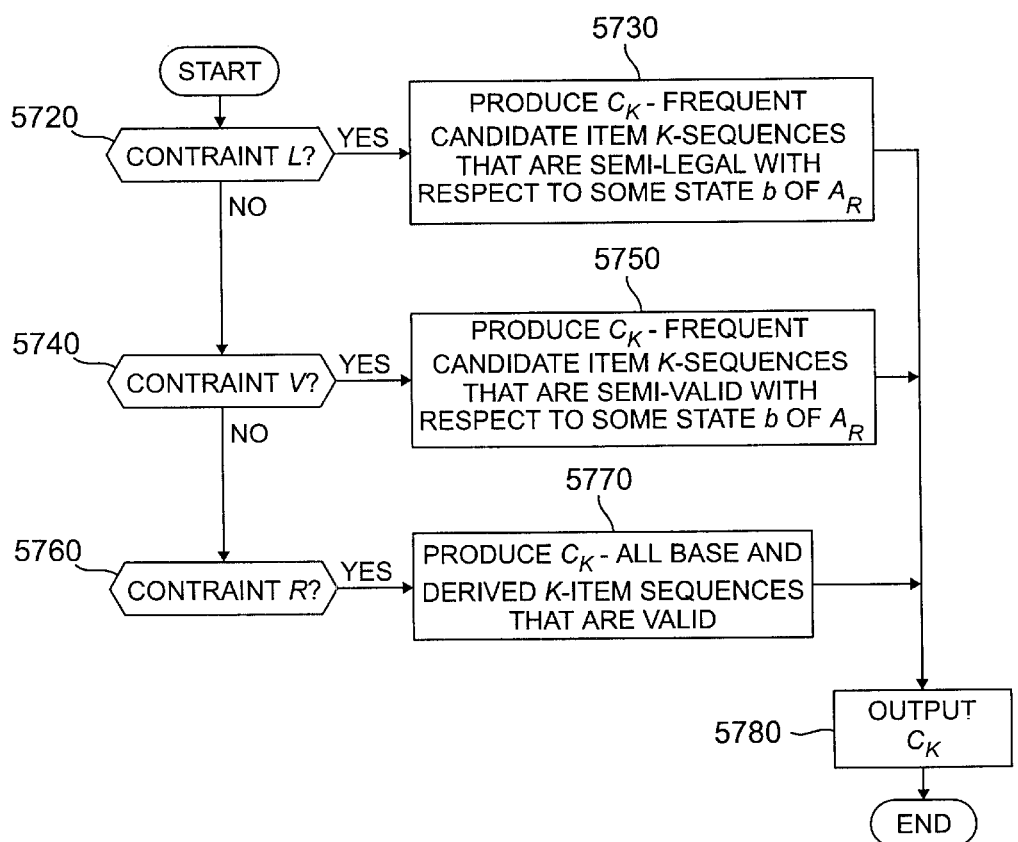
FIG. 7 is a high level flow chart describing the process of candidate generation for sequences whose elements are itemsets. This figure may also be considered a detailed description of step S130 of FIG. 1.

FIG. 7 is a high level flow chart of the process of generating the candidate sequence $C_k$ for sequences whose elements are itemsets. FIG. 7 is also a detailed description of Step S130 of FIG. 1. In Step S720, it is determined if the relaxed constraint selected is L. If so, in Step S740 candidate set $C_k$ is produced. To do so, a sequence s is defined to be a restrictedprefix of t if $s_1=t_1, \ldots, s_{|s|-1}=t_{|s|-1}$ and $s_{|s|} \subseteq t_{|s|}$. Then, for every state b in automaton $A_R$ and for every transition $$b \xrightarrow{w_i} c,$$

the following cases need to be considered in order to generate candidate k-item sequences that are semi-legal with respect to b:

1. $|w_i| \geq k$: In this case, all k-subsets of $w_i$ (that is, subsets containing k items) are added to $C_k$.
2. $|w_i|=k-1$: In this case, for all frequent items i, $<w_i \cup \{i\}>$ is added to $C_k$. Furthermore, itemset sequences $<w_i\{i\}>$ for items i $\epsilon F_1(c)$ are also added to $C_k$.
3. $|w_i|<k-1$: There are three distinct sub-cases.
   (a) Itemset sequences whose first element is exactly $w_i$ are computed as follows. For every sequence $<w_i s>$ in $F_{k-1}(b)$, if there exists a sequence t in $F_{k-|w_i|}(c)$ such that s is a restricted prefix of t 846, then $<w_i t>$ is added to $C_k$. ($|w_i|$ denotes the number of items in itemset $w_i$.)
   (b) Candidate sequences whose first element contains $|w_i|+1$ items are computed as follows. For every sequence $<(w_i \cup \{i\})s>$ (for some item i) in $F_{k-1}(b)$, if there exists a sequence $<w_i t>$ in $F_{k-1}(b)$ such that s is a restricted prefix of t, then $<(w_i \cup \{i\})t>$ is added to $C_k$.
   (c) Finally, candidates whose first element has more than $|w_i|+1$ items are generated as follows. For each pair of sequences $<(t_l \cup \{i.\}) s>$, $<(t_l \cup \{j\}) s>$ belonging to $F_{k-1}(b)$ for some items i,j, and such that $w_i \subseteq t_l$, add $<(t_l \cup \{i,j\}) s>$ to $C_k$.

In Step S740 it is determined if the relaxed constraint selected is V. If so, in Step S750 candidate set $C_k$ is produced. For every state b in the automaton $A_R$ and for every transition $$b \xrightarrow{w_i} c,$$

the following cases are considered in order to generate candidate k-item sequences that are semi-valid with respect to b:

1. $|w_i| \geq k$: In this case, if c is an accept state, all k-subsets of $w_i$ (that is, subsets containing k items) are added to $C_k$.

2. $|w_i| \geq k-1$: In this case, if c is an accept state, for all frequent items i, $w_i \cup \{i\}$ is added to $C_k$. Furthermore, itemset sequences <$w_i\{i\}$> for items $i \in F_1(c)$ are also added to $C_k$.

3. $|w_i| < k-1$: There are three distinct sub-cases.
   (a) Itemset sequences whose first element is exactly $w_i$ are computed as follows. For every sequence s in $F_{k-|wi|}(c)$, <$w_i s$> is added to $C_k$.
   (b) Candidate sequences whose first element contains $|w_i|+1$ items are computed as follows. For every sequence <$w_i s$> in $F_{k-1}(b)$, the sequence <$(w_i \cup \{i\})$ s> is added to $C_k$ for every frequent item i. An optimization for sequences <$w_i s$> for which the last element of s contains more than one item is to add <$(w_i \cup \{i\})$ s> to $C_k$ only if there exists a sequence <$(w_i \cup \{i\})$ t> in $F_{k-1}(b)$ such that t is a restricted prefix of s.
   (c) Finally, candidates whose first element has more than $|w_i|+1$ items are generated as follows. For each pair of sequences <$(t_l \cup \{i\})$ s>, <$(t_l \cup \{j\})$ s> belonging to $F_{k-1}(b)$ for some items i,j, and such that $w_i \subseteq t_l$, add <$(t_l \cup \{i,j\})$ s> to $C_k$.

In Step S760, it is determined if the relaxed constraint selected is R. If so, in Step S770 candidate set $C_k$ is produced and outputted in Step S280. The base candidate itemset sequences containing k items can be computed in the same manner as in the simple items case previously described. Algorithm GENCANDIDATESITEMSETS, set forth below, 1. For each base sequence s in $B_{k-1}$, for each element $w_j$ of s, and for each frequent item i, a candidate sequence containing k items is derived by replacing $w_j$ in the sequence s with $w_j \cup \{i\}$ (the derived sequence is added to $C_k$.

2. For each pair of derived sequences s and t (from the same base sequence) of length k-1 in $F_{k-1}$, if it is the case that for some l, m $s_l - t_l = \{i\}$, while $t_m - s_m = \{j\}$ for some items i and j, and for the remaining itemsets $p \neq l$, m, $s_p = t_p$, then the sequence <$s_1 \ldots s_m \cup \{j\} \ldots s_{|s|}$> is added to $C_k$. To see why this works, note that if a sequence is derived from a base sequence by adding two or more items, then every subsequence that results from deleting one of the added items is a derived sequence of the base sequence.

When a base sequence s contains a cycle in the automaton $A_R$, then when generating derived candidate sequences from s that contain numItems(s)+1 items by adding an item to an element of s, earlier cycle optimizations can be exploited to make this step more efficient. For instance, let s=<t u v >where u creates a cycle in $A_R$. Now, <t v> is a base sequence that is frequent with fewer items than s. Thus, when considering the items with which an element of t or v of the new longer base sequence s can be extended by, only the items that when used to extend the corresponding

---

Procedure GENCANDIDATEITEMSETS(s, b, B)
begin
1.     for each transition $b \xrightarrow{w_i} c$ in $A_R$ do {
2.         if (numItems(< s $w_t$ >) = k and c is an accept state) $C_k = C_k \cup \{< s w_t >\}$
3.         if (numItems(< s $w_t$ >) < k and (c is not an accept state or < s $w_t$ >$\in B_{numItems(<s\ wt>)})$) }
4.             if (c $\in$ B) {
5.                 let s = < tu >, where t is the prefix of s for which $b \overset{t}{\Rightarrow} c$
6.                 $C_k := C_k \cup \{< t\ u\ w_i\ v >: < t\ v >\in B_{k-numItems(<u\ wt>)}\}$
7.             }
8.             else GENCANDIDATEITEMSETS(< s $w_t$ >, c, B $\cup$ {b})
9.         }
10.    }
end

--- computes all candidate base sequences with k items by enumerating paths in the automaton $A_R$. How the derived sequences can also be computed is discussed below. The set $B_k$ denotes the frequent base k-item sequences, while $F_k$ denotes all the frequent sequences (base and derived) containing k items. The function numItems(s) returns the total number of items contained in sequence s.

As mentioned earlier, candidate base k-item sequences can be generated by invoking procedure GENCANDIDATESITEMSETS with input arguments s=$\epsilon$(the empty sequence) b=a ($A_R$'s start state), and B={a}. Candidate derived sequences that result from the addition of items to some base sequence of size less than k are preferably generated as follows:

element of t or v in the shorter base sequence <t v >need to be considered, resulted in a frequent itemset sequence. This can be used to prune the number of candidates derived from the longer base sequence s by the addition of a single item.

Candidate Pruning

Figure 8:
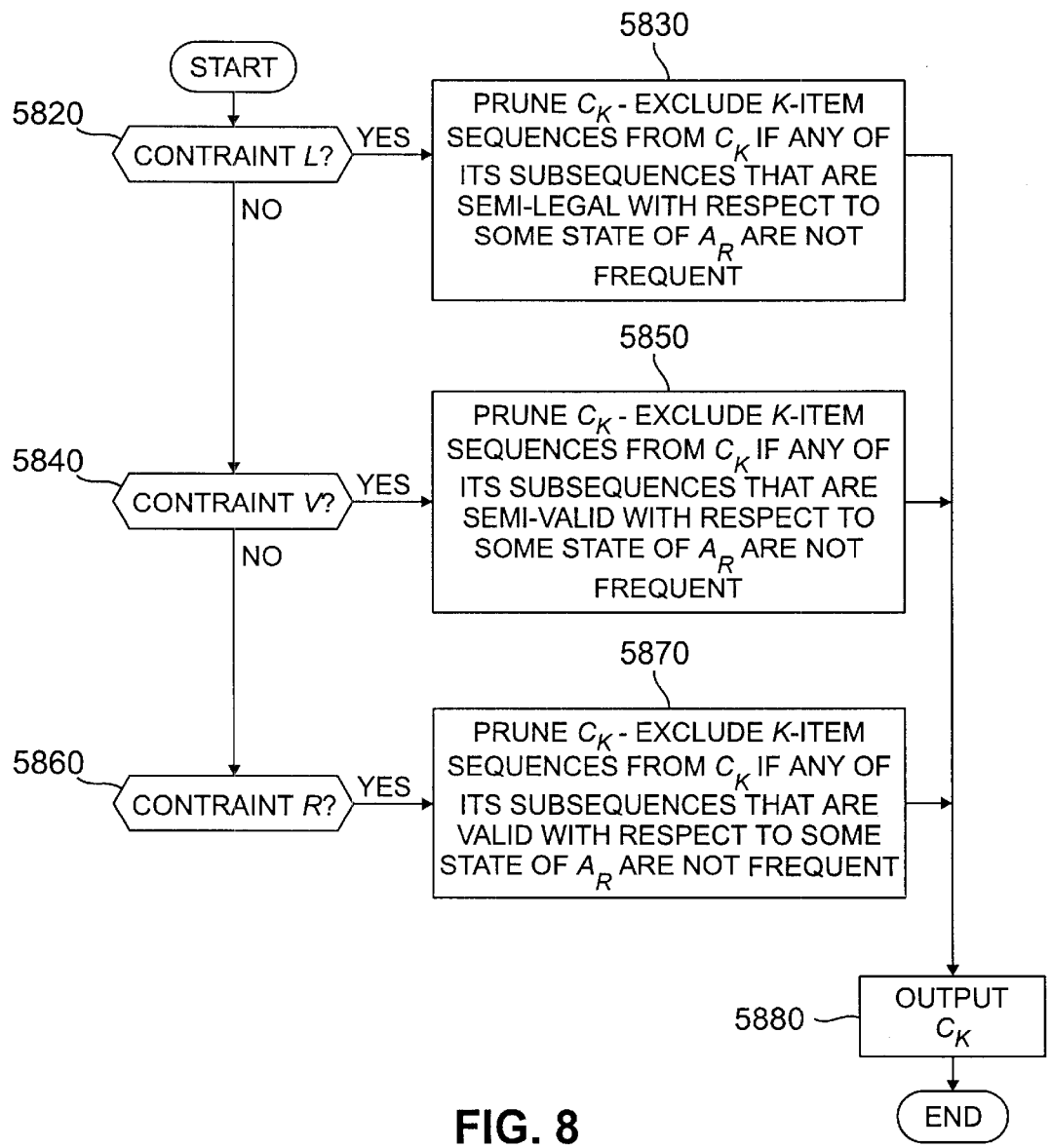
FIG. 8 is a high level flow chart describing the process of pruning the generated candidates for sequences whose elements are itemsets. This figure may also be considered a detailed description of step S140 of FIG. 1.

FIG. 8 is a high level flow chart of the process of pruning the candidate set $C_k$. FIG. 8 is also a detailed description of Step S140 of FIG. 1. In Step S820, it is determined if the relaxed constraint selected is constraint L. If so, in Step S830 candidate set $C_k$ is pruned and outputted in Step S880. The key idea in this step is to generate for every candidate k-item sequence s $\in C_k$, all its subsequences (with fewer than k items) that are semi-legal with respect to some state of $A_R$. If any of these subsequences is not frequent, then s cannot possibly be frequent and can thus be safely deleted from $C_k$. Algorithm FINDMAXSUBSEQITEMSETS, set forth below,

```
Procedure FINDMAXSUBSEQITEMSETS(Start, End, s)
begin
1.      for each state b in automaton A_R do
2.              maxSeq[b] := 0
3.      for l := |s| down to 1 do
4.              for each state b in automaton A_R do {
5.                      tmpSeq[b] = 0

6.                      for each transition b —w_i→ c in A_R such that w_i ∩ s_i ≠ ∅ do {

7.                              if (c ∈ End)
8.                                      if (w_i ⊂ s_1) add s_1 and all (|s_1| - 1)-subsets of s_1 that contain w_i to tmpSeq[b]
9.                                      else add w_i ∩ s_1 and all (|w_i ∩ s_1| - 1)-subsets of w_i ∩ s_1 to tmpSeq[b]
10.                             if (w_i ⊂ s_1) add to tmpSeq[b] all itemset sequences < v_t t >, where t is in maxSeq[c] and v_t
11.                                     is either s_t or a (|s_t| - 1)-subset of s_t that contains w_i
12.                             else if (w_i = s_t) add to tmpSeq[b] itemset sequences <w_i t >, where t is in maxSeq[c]
13.                     }
14.             }
15.             for each state b in automaton A_R do {
16.                     maxSeq[b] := maxSeq[b] ∪ tmpSeq[b]
17.                     for each sequence t in maxSeq[b] do
18.                             if (there exists a sequence u ≠ < s_t ... s_|s| > in maxSeq[b] such that t is a subsequence of u)
19.                                     delete t from maxSeq[b]
20.             }
21.     }
22.     return ∪_{b∈Start} maxSeq[b] - {s} (after deleting non-maximal sequences)
end
``` is similar to FINDMAXSUBSEQ discussed earlier for item sequences, and computes the maximal semi-legal subsequences of a candidate k-item sequence s that contain less than k items. Each of the sequences is semi-legal with respect to a state in Start and, when applied, results in a state in End. In order to compute all the semi-legal subsequences of s, FINDMAXSUBSEQITEMSETS is invoked with Start and End both equal to the set of all states in $A_R$.

In Step S840, it is determined if the relaxed constraint selected is constraint V. If so, in Step S850 candidate set $C_k$ is pruned and outputted in Step S880. For a candidate sequence s in $C_k$, algorithm FINDMAXSUBSEQITEMSETS, previously discussed, can be used to compute the maximal semi-valid subsequences of s (with respect to some state of the automaton $A_R$) containing fewer than k items. The parameter Start is set to be equal to all the states of $A_R$, while End is the set of all accept states of $A_R$. If any of these subsequences is not contained in F, then s is deleted from $C_k$.

In Step S860, it is determined if the relaxed constraint selected is constraint R. If so, in Step S870 candidate set $C_k$ is pruned and outputted in Step S880. For each candidate sequence s in $C_k$, if a valid subsequence of s with fewer than k items is not contained in F, then s is deleted from $C_k$. The maximal valid subsequences of s can be computed using algorithm FINDMAXSUBSEQITEMSETS, previously discussed, with a slight modification, since the interest is now in valid (rather than semi-valid) subsequences. Thus, Step 9 should read "else if ($w_i=s_l$) add $w_i$ to tmpSeq[b]" (since if $s_l \subset w_i$, then it cannot be part of a valid sequence involving transition $w_i$). Of course, algorithm FINDMAXSUBSEQITEMSETS must be invoked with Start and End equal to the start and accept states of a, respectively.

Terminating Conditions

Figure 9:
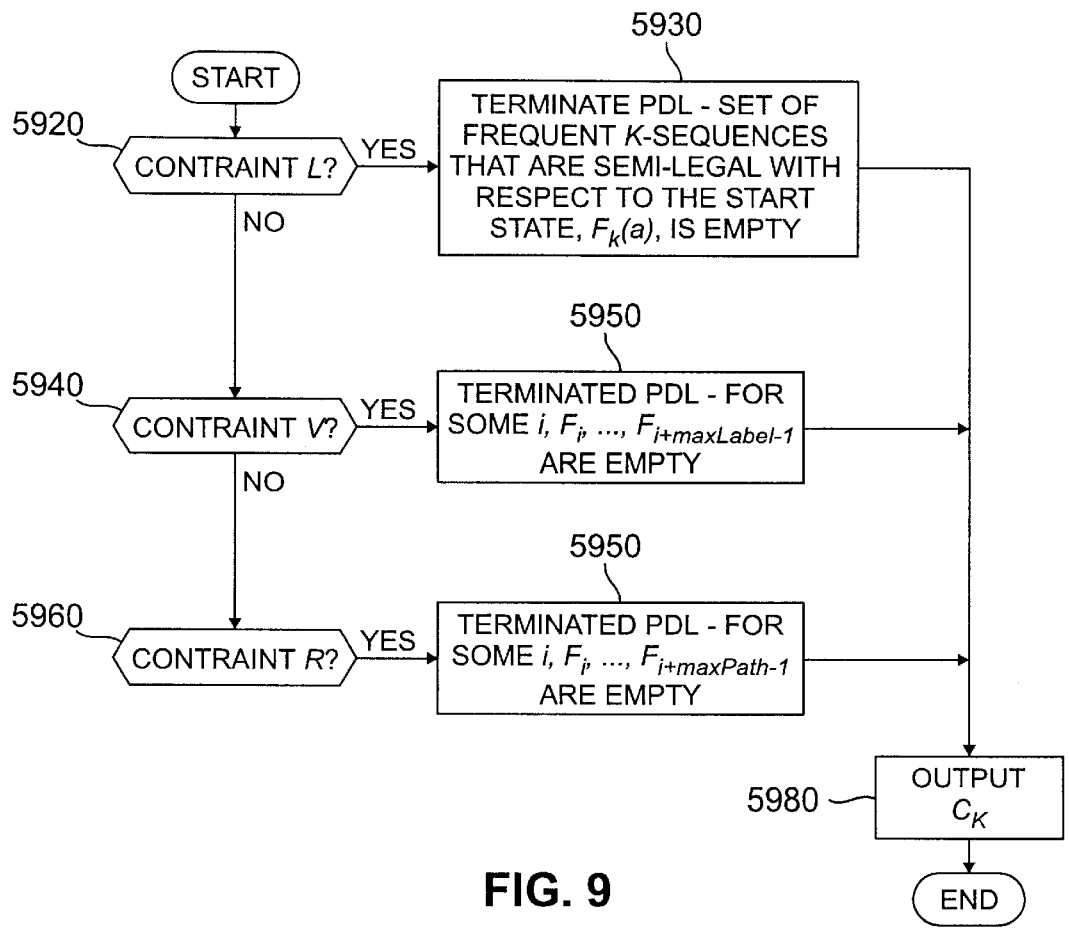
FIG. 9 is high level flow chart describing the process of terminating the pattern discovery loop for sequences whose elements are itemsets. This figure may also be considered a detailed description of step S160 of FIG. 1.

Referring now to FIG. 9, FIG. 9 is a high level flow chart of the process of identifying the terminating conditions to be used in determining whether to terminate the pattern discovery loop in FIG. 1. FIG. 9 is also a detailed description of Step S160 in FIG. 1. In Step S920, it is determined if the relaxed constraint selected is L. If so, in Step S930 it is determined if the set of frequent sequences that are semi-legal with respect to the start state, $F_k(a)$, is empty. If so, the pattern discovery loop is terminated in Step S980.

In Step S940, it is determined if the relaxed constraint selected is V. If so, in Step S950 it is determined if for some i, $F_i, \ldots, F_{i+maxLabel-1}$ is empty, where maxLabel is the maximum number of items contained in any transition label of automaton $A_R$. If so, the pattern discovery loop is terminated in Step S980.

In Step S960, it is determined if the relaxed constraint selected is R. If so, in Step S970 it is determined if for some i, $F_i, \ldots, F_{i+maxPath-1}$ are all empty, where maxPath is the maximum number of items along paths of $A_R$ that do not contain cycles. If so, the pattern discovery loop is terminated in Step S980.

Handling the Maximum Distance Constraint

In the presence of a distance constraint δ, the problem is to compute valid sequences s such that the fraction of data sequences of which s is a δ-distance subsequence, exceeds the minimum support threshold. A key difference, when the distance constraint is specified, is that every subsequence of a frequent sequence may not necessarily also befrequent. However, every contiguous (i.e., 1-distance) subsequence of a frequent sequence is still guaranteed to be frequent. The impact of maximum distance constraints on the present invention will now be considered for both the item and itemset cases.

Item Sequences. The contiguity requirement for frequent subsequences makes the candidate pruning steps presented earlier inapplicable for when the selected relaxed constraint is N or L. However, except for this, the candidate generation and termination steps remain the same and can be used to mine sequences in the presence of distance constraints.

The steps also remain the same when the relaxed constraint is V, except for the candidate pruning step. In this case, the candidate pruning phase first computes the maximal prefix of the candidate k-sequence s whose length is less than k and that is valid with respect to some state of $A_R$ (the computation of this in time $O(k*|A_R|)$ is straightforward). If this maximal prefix is not contained in F, then the candidate is pruned.

Finally, both the candidate generation and the candidate pruning steps need to be modified to handle the distance constraint when the selected relaxed constraint is R. In the candidate generation step, the second optimization to exploit cycles in the automaton $A_R$ cannot be used since eliminating cycles from a sequence does not result in a contiguous subsequence of the original sequence. Thus, Steps 4–9 that span the body of the if condition in Step 3 must simply be replaced with GENCANDIDATES(<s $w_i$>, b, B∪{b}). In the candidate pruning step, a candidate sequence s is pruned from $C_k$ if some valid contiguous subsequence of s with length less than k is not in F (this can be computed in $O(k^2)$ steps).

Itemset Sequences. As in the case of simple items, the contiguity requirement imposed by the maximum distance constraint mainly affects the candidate pruning phase. More specifically, the new pruning rules can be summarized as follows.

Relaxed constraint L: Consider the longest (contiguous) prefix t of a candidate k-item sequence s, such that (a) t contains at most k–1 items, and (b) t is semi-legal with respect to some state of $A_R$. If t is not frequent then s can be pruned from $C_k$.

Relaxed constraint V: Consider the longest (contiguous) prefix t of a candidate k-item sequence s, such that (a) t contains at most k–1items, and (b) t is semi-valid with respect to some state of $A_R$. If t is not frequent then s can be pruned from $C_k$.

Relaxed constraint R: Consider any contiguous subsequence t of a candidate k-item sequence s, such that (a) t contains at most k–1items, and (b) t is valid. If t is not frequent then s can be pruned from $C_k$.

As noted, method steps of the present invention can appropriately and advantageously be carried out using a suitably programmed general purpose computer. Moreover, these steps may also be implemented on an Integrated Circuit or part of an Integrated Circuit. Thus, it is to be understood that the invention may be implemented in hardware, software, or a combination of both. Accordingly, the present invention includes a program storage device readable by machine to perform any of the method steps herein described for sequential pattern mining with regular expression constraints. Again, it is to be emphasized that any of the method steps, in any combination, can be encoded and be tangibly embodies on a program storage device in accordance with the present invention.

While there have been described what are presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for sequential pattern mining using a given constraint, said method comprising the steps of:

selecting a second constraint less restrictive than the given constraint;

identifying a set of frequent items which satisfy the second less restrictive constraint;

producing a set of candidate sequences that satisfy the second less restrictive constraint;

removing from the set of candidate sequences those sequences containing at least one subsequence that satisfies the second less restrictive constraint and is not frequent;

counting support for all remaining candidate sequences; and continuing to successively produce a set of candidate sequences that satisfy the second less restrictive constraint, remove from the set of candidate sequences those sequences containing at least one subsequence that satisfies the second less restrictive constraint and is not frequent, and count support for all remaining candidate sequences until a given terminating condition is satisfied.

2. The method of claim 1, wherein the set of candidate sequences that satisfy the second less restrictive constraint is produced by determining which potentially frequent k-item sequences are legal with respect to some state of the automaton representing the given constraint.

3. The method of claim 2, wherein the sequences removed from the set of candidate sequences are those sequences in which one of its subsequences that is legal with respect to some state of the automaton is not frequent.

4. The method of claim 1, wherein the set of candidate sequences that satisfy the second less restrictive constraint is produced by determining which potentially frequent k-item sequences are valid with respect to some state of the automaton representing the given constraint.

5. The method of claim 4, wherein the sequences removed from the set of candidate sequences are those sequences in which one of its subsequences that is valid with respect to some state of the automaton is not frequent.

6. The method of claim 1, wherein the set of candidate sequences that satisfy the second less restrictive constraint is produced by determining all potentially frequent k-item sequences which are valid for the automaton representing the given constraint.

7. The method of claim 6, wherein the sequences removed from the set of candidate sequences are those sequences in which one of its valid subsequences is not frequent.

8. The method of claim 1, wherein the set of candidate sequences that satisfy the second less restrictive constraint is produced by determining which potentially frequent k-itemset sequences are semi-legal with respect to some state of the automaton representing the given constraint.

9. The method of claim 8, wherein the sequences removed from the set of candidate sequences are those sequences in which one of its subsequences that is semi-legal with respect to some state of the automaton is not frequent.

10. The method of claim 1, wherein the set of candidate sequences that satisfy the second less restrictive constraint is produced by determining which potentially frequent k-itemset sequences are semi-valid with respect to some state of the automaton representing the given constraint.

11. The method of claim 10, wherein the sequences removed from the set of candidate sequences are those sequences in which one of its subsequences that is semi-valid with respect to some state of the automaton is not frequent.

12. The method of claim 1, wherein the set of candidate sequences that satisfy the second less restrictive constraint is produced by determining all potentially frequent k-itemset sequences which are valid for the automaton representing the given constraint.

13. The method of claim 2, wherein the sequences removed from the set of candidate sequences are those itemset sequences in which one of its valid subsequences is not frequent.

14. A method for producing candidate sets of item sequences for use in sequential pattern mining using a given constraint, said method comprising the steps of:

determining an automaton which represents the given constraint;

selecting a second constraint less restrictive than the given constraint; and producing a candidate set of item sequences which satisfies the second less restrictive constraint by composing those potentially frequent k-item sequences for the automaton from the set consisting of those (1) which are legal with respect to some state of the automaton, (2) which are valid with respect to some state of the automaton, or (3) which are valid for the automaton, depending on the degree to which the second constraint is less restrictive than the given constraint.

15. A method for producing candidate sets of itemset sequences for use in sequential pattern mining using a given constraint, said method comprising the steps of:

determining an automaton which represents the given constraint;

selecting a second constraint less restrictive than the given constraint; and producing a candidate set of itemset sequences which satisfies the second less restrictive constraint by composing those potentially frequent k-itemset sequences for the automaton from the set consisting of those (1) which are semi-legal with respect to some state of the automaton, (2) which are semi-valid with respect to some state of the automaton, or (3) which are valid for the automaton, depending on the degree to which the second constraint is less restrictive than the given constraint.

16. A method for pruning candidate item sequences having subsequences for use in sequential pattern mining using a given constraint, said method comprising the steps of:

determining which automaton representing the given constraint was used to produce the candidate set;

determining which second constraint less restrictive than the given constraint was used to produce the candidate set; and pruning the candidate set of k-item sequences which satisfy the second less restrictive constraint by removing from the set of candidate k-item sequences those containing at least one subsequence which is not frequent and (1) which is legal with respect to a state of the automaton, (2) which is valid with respect to a state of the automaton, or (3) which is valid for the automaton, depending on which second constraint is less restrictive than the given constraint was used to produce the candidate set.

17. A method for pruning candidate itemset sequences having subsequences for use in sequential pattern mining using a given constraint, said method comprising the steps of:

determining which automaton representing the given constraint was used to produce the candidate set;

determining which second constraint less restrictive than the given constraint was used to produce the candidate set; and pruning the candidate set of k-itemset sequences which satisfy the second less restrictive constraint by removing from the candidate set of k-itemset sequences those containing at least one subsequence which is not frequent and (1) which is semi-legal with respect to a state of the automaton, (2) which is semi-valid with respect to a state of the automaton, or (3) which is valid for the automaton, depending on which second constraint is less restrictive than the given constraint was used to produce the candidate set.

18. A program storage device readable by machine, tangibly embodying a program of instructions executable by the machine to perform method steps for sequential pattern mining using a given constraint, said method steps comprising:

selecting a second constraint less restrictive than the given constraint;

identifying a set of frequent items which satisfy the second less restrictive constraint;

producing a set of candidate sequences that satisfy the second less restrictive constraint;

removing from the set of candidate sequences those sequences containing at least one subsequence that satisfies the second less restrictive constraint and is not frequent;

counting support for all remaining candidate sequences; and continuing to produce a set of candidate sequences that satisfy the second less restrictive constraint, remove from the set of candidate sequences those sequences containing at least one subsequence that satisfies the second less restrictive constraint and is not frequent, and count support for all remaining candidate sequences until a given terminating condition is satisfied.

* * * * *